United States Patent
Kuo et al.

(10) Patent No.: US 10,896,500 B2
(45) Date of Patent: Jan. 19, 2021

(54) DISPLAY AND METHOD FOR DISPLAYING DYNAMIC INFORMATION OF OBJECT

(71) Applicants: Industrial Technology Research Institute, Hsinchu (TW); Intellectual Property Innovation Corporation, Hsinchu (TW)

(72) Inventors: Shin-Hong Kuo, New Taipei (TW); Kuan-Ting Chen, Yunlin County (TW); Yu-Hsin Lin, Miaoli County (TW); Yi-Shou Tsai, Taipei (TW); Yu-Hsiang Tsai, Hsinchu County (TW); Yi-Hsiang Huang, Changhua County (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 126 days.

(21) Appl. No.: 16/140,548

(22) Filed: Sep. 25, 2018

(65) Prior Publication Data
US 2019/0164266 A1    May 30, 2019

Related U.S. Application Data

(60) Provisional application No. 62/591,780, filed on Nov. 29, 2017.

(30) Foreign Application Priority Data

Jun. 29, 2018    (TW) .............................. 107122498 A

(51) Int. Cl.
*G06T 7/00* (2017.01)
*G06T 3/40* (2006.01)
(Continued)

(52) U.S. Cl.
CPC ............ *G06T 7/001* (2013.01); *G06F 3/0481* (2013.01); *G06T 3/40* (2013.01); *G06T 7/215* (2017.01); *G06T 11/60* (2013.01); *G09G 5/00* (2013.01)

(58) Field of Classification Search
None
See application file for complete search history.

(56) References Cited

U.S. PATENT DOCUMENTS

| 7,128,705 B2 | 10/2006 | Brendley et al. |
| 9,153,009 B2 | 10/2015 | Kim |

(Continued)

FOREIGN PATENT DOCUMENTS

| CN | 103814382 | 5/2014 |
| CN | 104508597 | 4/2015 |

(Continued)

OTHER PUBLICATIONS

"Office Action of China Counterpart Application", dated May 13, 2020, p. 1-p. 9.

(Continued)

*Primary Examiner* — Howard Cortes
(74) *Attorney, Agent, or Firm* — JCIPRNET

(57) ABSTRACT

An image information display method, an image information display system and a display. The method includes: capturing a background image of the display; obtaining an object according the background image; capturing a relative movement information between a first user and the object; capturing a visual information corresponding to the first user; determining whether a reading comfort degree corresponding to the object meets a predetermined condition according to the relative movement information and the visual information; displaying a dynamic information corresponding to the object by the display when the reading (Continued)

comfort degree meets the predetermined condition; and not displaying the dynamic information corresponding to the object by the display when the reading comfort degree does not meet the predetermined condition.

22 Claims, 17 Drawing Sheets

(51) Int. Cl.
*G06T 11/60* (2006.01)
*G06F 3/0481* (2013.01)
*G06T 7/215* (2017.01)
*G09G 5/00* (2006.01)

(56) References Cited

U.S. PATENT DOCUMENTS

| | | | | |
|---|---|---|---|---|
| 10,043,298 | B2* | 8/2018 | Grams | G06T 11/60 |
| 2006/0202952 | A1* | 9/2006 | Sato | G06F 3/011 |
| | | | | 345/156 |
| 2013/0021373 | A1* | 1/2013 | Vaught | G02B 27/017 |
| | | | | 345/633 |
| 2013/0044130 | A1* | 2/2013 | Geisner | G09G 5/00 |
| | | | | 345/633 |
| 2013/0044135 | A1* | 2/2013 | Lee | G09G 5/00 |
| | | | | 345/660 |
| 2013/0147836 | A1* | 6/2013 | Small | G06F 3/011 |
| | | | | 345/633 |
| 2013/0342427 | A1 | 12/2013 | Cai et al. | |
| 2015/0206321 | A1* | 7/2015 | Scavezze | G06F 3/013 |
| | | | | 345/633 |
| 2017/0293356 | A1 | 10/2017 | Khaderi et al. | |
| 2017/0316616 | A1* | 11/2017 | Malamud | G06T 17/05 |
| 2017/0323160 | A1 | 11/2017 | Porsch | |
| 2018/0095528 | A1* | 4/2018 | Tao | G06F 40/103 |
| 2019/0094962 | A1* | 3/2019 | Fujita | G06F 3/013 |
| 2019/0220500 | A1* | 7/2019 | Dhaundiyal | G06F 9/451 |
| 2019/0370590 | A1* | 12/2019 | Sun | G06T 19/006 |

FOREIGN PATENT DOCUMENTS

| | | |
|---|---|---|
| CN | 105306084 | 2/2016 |
| CN | 105589199 | 5/2016 |
| CN | 105934730 | 9/2016 |
| CN | 106293561 | 1/2017 |
| TW | 200940116 | 10/2009 |
| TW | 201310322 | 3/2013 |
| TW | I552907 | 10/2016 |
| TW | 201734712 | 10/2017 |

OTHER PUBLICATIONS

"Office Action of Taiwan Counterpart Application", dated Mar. 17, 2020, p. 1-p. 6.

* cited by examiner

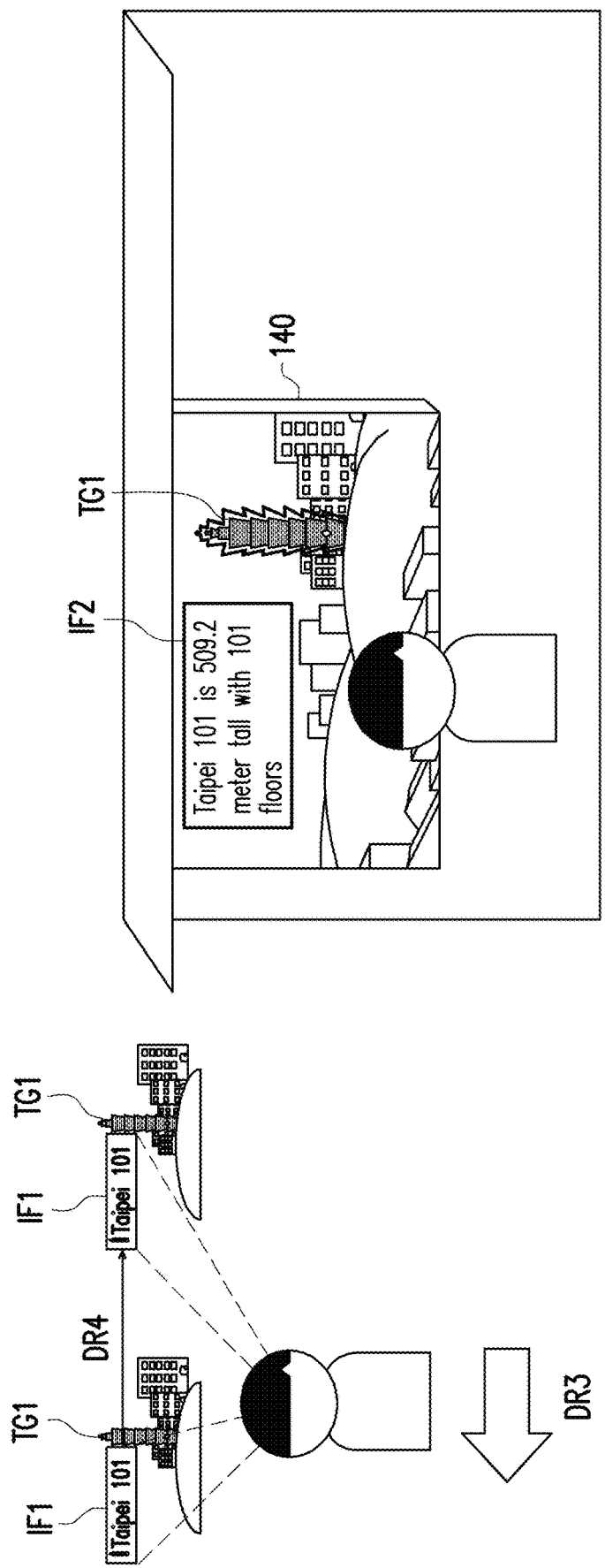

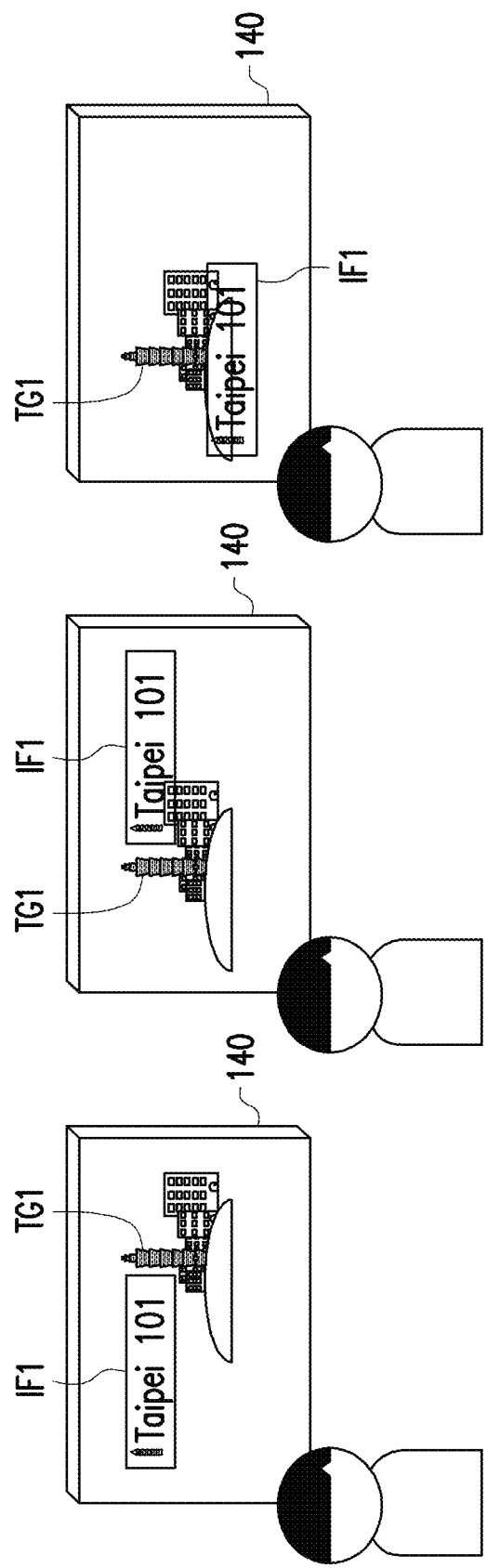

DISPLAY AND METHOD FOR DISPLAYING DYNAMIC INFORMATION OF OBJECT

CROSS-REFERENCE TO RELATED APPLICATION

This application claims the priority benefits of U.S. provisional application Ser. No. 62/591,780, filed on Nov. 29, 2017 and Taiwan application serial no. 107122498, filed on Jun. 29, 2018. The entirety of each of the above-mentioned patent applications is hereby incorporated by reference herein and made a part of this specification.

TECHNICAL FIELD

The disclosure is related to an image information display method, an image information display system and a display.

BACKGROUND

The information and communication industries have become indispensable in our society thanks to the focused development of various portable communication and display products. As the flat panel display is one of the communication interfaces between human and an information device, development of the flat panel display is rather essential. In addition, the technology of transparent display panels is now being actively developed. The transparent display panels refer to display panels that are transparent to a certain extent, so that the background behind the display panels can be clearly seen. The displays are suitable for the windows of buildings and vehicles, and the display windows of shops.

Specifically, the display and an Augmented Reality (AR) technology are combined, so that a virtual scenery and a real scenery behind the display can be overlapped. The display is also often used for realizing the above-mentioned guidance and explication applications. For example, the display configured on a vehicle may simultaneously display scenery outside a window and relevant information (for example, explicatory information or other advertisement information) corresponding to the scenery. That is to say, only when the scenery seen by the display and the relevant information that is displayed by the display and corresponds to the scenery fall within a range within which a viewer can simultaneously view the two, a relative position between the outside scenery in a visual line of the viewer and the relevant information thereof may be kept fixed. It should be pointed out that when the vehicle is moved, the scenery that is closer to the viewer stays for a shorter time in the viewer's field of vision, and the scenery that is farther from the viewer stays for a longer time in the viewer's field of vision. Therefore, when the vehicle is moved, the moving speed of related information displayed by the display needs to keep up with the moving speed of the scenery in order to generate association. If the moving speed of the related information is inconsistent with the moving speed of the corresponding scenery, the user is likely to feel dizzy and finds it difficult to recognize the information.

SUMMARY

Embodiments of the disclosure provide an image information display method, an image information display system and a display, enabling the display to display related information (e.g., dynamic information or static information) of a target scenery. In order to reduce the problem that user feels dizzy and has difficulty recognizing the displayed related information when the vehicle is moving at a high speed, the image information display method, image information display system and display of the disclosure provide an information display method that is more suitable and comfortable for user.

An embodiment of the disclosure provides an image information display method, including capturing a background image of a display; obtaining an object according to the background image; capturing a relative movement information between a first user and the object; capturing a visual information corresponding to the first user; determining whether a reading comfort degree corresponding to the object meets a predetermined condition according to the relative movement information and the visual information; displaying a dynamic information corresponding to the object by the display when the reading comfort degree meets the predetermined condition; and not displaying the dynamic information corresponding to the object by the display when the reading comfort degree does not meet the predetermined condition.

An embodiment of the disclosure provides a display, including a display circuit, a data capturing circuit and a processor. The data capturing circuit captures a background image of the display. The processor obtains an object according to the background image. The data capturing circuit captures a relative movement information between a first user and the object. The data capturing circuit captures a visual information corresponding to the first user. The processor determines whether a reading comfort degree corresponding to the object meets a predetermined condition according to the relative movement information and the visual information. The display circuit displays a dynamic information corresponding to the object when the reading comfort degree meets the predetermined condition. The display circuit does not display the dynamic information corresponding to the object when the reading comfort degree does not meet the predetermined condition.

Several exemplary embodiments accompanied with figures are described in detail below to further describe the disclosure in details.

BRIEF DESCRIPTION OF THE DRAWINGS

FIG. 7a and FIG. 7b are schematic views showing displaying related information of an object according to an embodiment of the disclosure.

FIG. 11a to FIG. 11f are schematic views of display position of dynamic information according to an embodiment of the disclosure.

DESCRIPTION OF EMBODIMENTS

Figure 1:
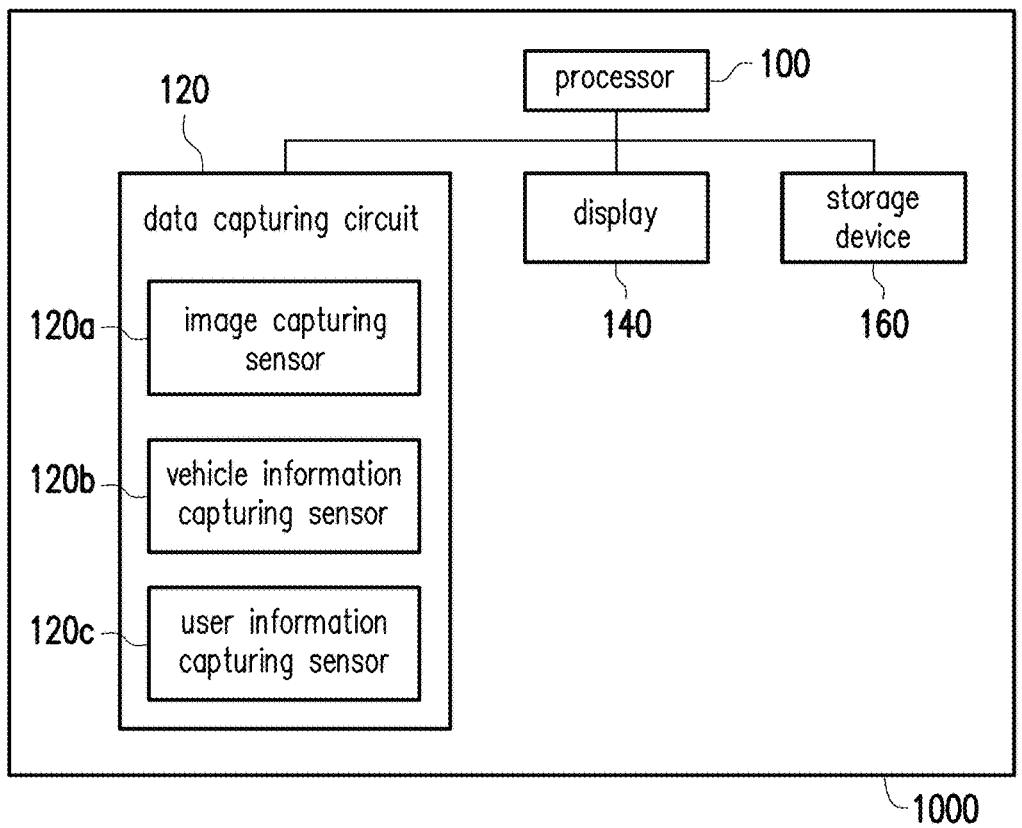
FIG. 1 is a schematic view of an image information display system according to an embodiment of the disclosure.

In order to make the disclosure more comprehensible, embodiments are described below as the examples to prove that the disclosure can actually be realized. In addition, wherever possible, elements/components/steps denoted by the same reference numerals in drawings and embodiments represent the same or similar parts.

FIG. 1 is a schematic view of an image information display system according to an embodiment of the disclosure.

Referring to FIG. 1, an image information display system 1000 includes a processor 100, a data capturing circuit 120, a display 140 and a storage device 160. The processor 100, the data capturing circuit 120, the display 140 and the storage device 160 are coupled to each other in a wired or wireless manner.

The processor 100 may be a central processing unit (CPU), or other programmable general purpose or specific purpose microprocessor, a digital signal processor (DSP), a programmable controller, an application specific integrated circuit (ASIC), or other similar element or a combination of the above.

The display 140 may be a display capable of instantly showing a background image on the display. If the display 140 is disposed on a vehicle, the display 140 may pre-store related information of a predetermined object (e.g., Taipei 101, Kaohsiung exhibition center) on a path of the vehicle through a random storage medium (e.g., solid-state drive, cloud hard drive and so on), and obtains related information of the predetermined object according to the position where the vehicle is arrived and the predetermined object corresponding to the position. The display 140 may also be a display (e.g., google glasses and so on) that projects dynamic information into user's eyes when the user watches a target image. The disclosure provides no limitation to the display 140.

In another embodiment, the display 140 may have a certain degree of light transmittance, such as a transparent display capable of showing the background behind a panel. In other words, a display region of the display 140 is visually transparent. The display 140 of the embodiment may be adapted to windows of buildings (e.g., sightseeing stage, aquarium, and museum), display windows, vehicle glass combined with display, etc.

The data capturing circuit 120 may include an image capturing sensor 120a, a vehicle information capturing sensor 120b and a user information capturing sensor 120c. The image capturing sensor 120a is, for example, a video camera, a camera, a radar, a lidar, a range finder using a charge coupled device (CCD) lens, a complementary metal oxide semiconductor transistors (CMOS) lens or an infrared lens, and can be disposed at any position on the display 140. The disclosure provides no limitation to the configuration position of the image capturing sensor 120a. In the example, the image capturing sensor 120a may be configured to capture the image of the scenery behind the panel of the display 140 to obtain the background image, and to determine whether the object in the scenery is moved according to the captured image. Additionally, the image capturing sensor 120a may further be configured to capture the image of the user in front of the panel of the display 140 to determine whether the user is moved so as to generate the movement information of the user. The vehicle information capturing sensor 120b may be, for example, an instrument that includes a vehicle speedometer, a gyroscope, a global positioning system (GPS) that can measure speeds, accelerations and positions, and can be used to obtain the movement information of the vehicle. The user information capturing sensor 120c may, for example, include an eye-tracking system or an eye-tracking circuit and configured to determine user's viewing angle and the viewed scenery. Additionally, the user information capturing sensor 120c may be a related circuit used to search user's preference from database or a related circuit that allows user to input user's preference manually.

The storage device 160 may be a fixed or a moveable random access memory (RAM) in any forms, a read-only memory (ROM), a flash memory or similar element or a combination of the above.

In the exemplary embodiment, the storage device 160 of the image information display system 1000 stores a plurality of program code segments. After the program code segments are installed, they are executed by the processor 100. For example, the storage device 160 includes a plurality of modules, and various operations in the image information display system 1000 are respectively performed by the modules, wherein each of the modules consists of one or more program code segments, but not limited thereto. Various operations of the image information display system 1000 may be realized in the form of other hardware.

However, it should be indicated that, in an embodiment, the operations that can be performed by the image information display system 1000 may be integrated into one single display. For example, FIG. 2 is a schematic view of a display having the function of image information display system according to an embodiment of the disclosure.

Figure 2:
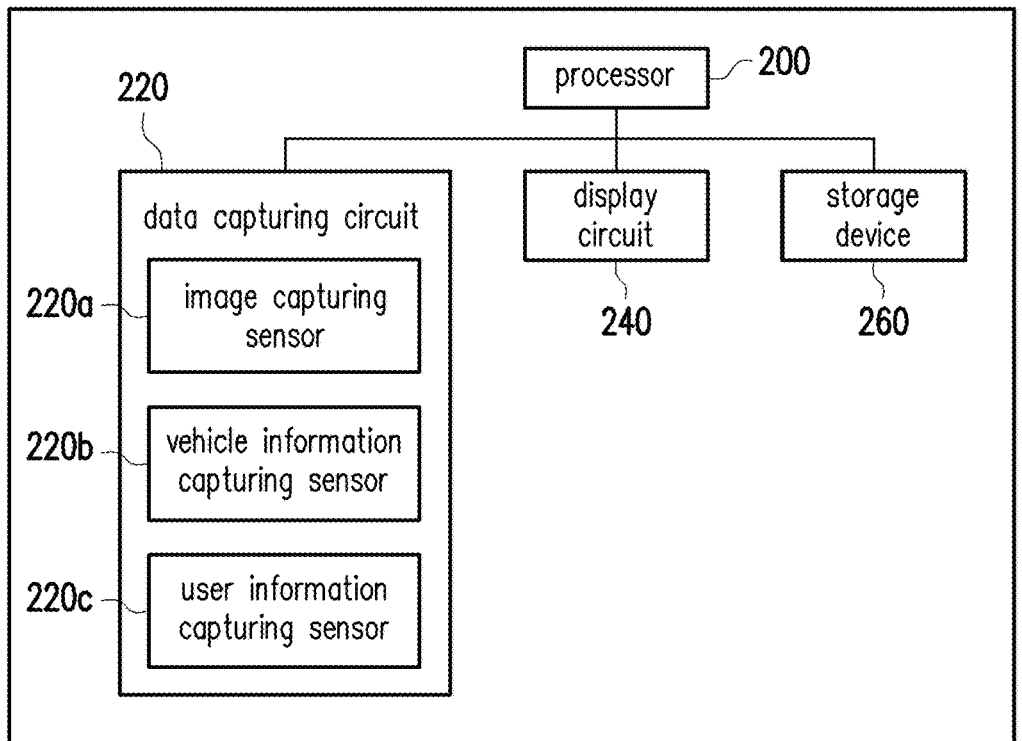
FIG. 2 is a schematic view of a display having the function of image information display system according to an embodiment of the disclosure.

Referring to FIG. 2, a display 2000 in FIG. 2 includes a processor 200, a data capturing circuit 220, a display circuit 240 and a storage device 260. Specifically, the processor 200, the data capturing circuit 220, the display circuit 240 and the storage device 260 are coupled to each other through a wired or wireless manner.

The processor 200, the data capturing circuit 220 and the storage device 260 may be similar to the processor 100, the data capturing circuit 120 and the storage device 160 respectively, and thus related descriptions are omitted hereinafter. The image capturing sensor 220a, the vehicle data capturing sensor 220b and the user information capturing sensor 220c may be similar to the image capturing sensor 120a, the vehicle information capturing sensor 120b and the user information capturing sensor 120c respectively, and thus related descriptions are omitted hereinafter.

The display circuit 240 may be a display device having display function in the display region of the display 2000. The display circuit 240 may be a display device having display function such as a liquid crystal display (LCD), a light-emitting diode (LED), a field emission display (FED).

In the exemplary embodiment, the storage device 260 of the display 2000 stores a plurality of program code segments. After the program code segments are installed, they are executed by the processor 200. For example, the storage device 260 includes a plurality of modules, and various operations of the display 2000 are respectively performed by the modules, wherein each of the modules consists of one or more program code segments, but not limited thereto. The various operations of the display 2000 may be realized in the form of other hardware.

In order to make explanation easy, the following embodiment is exemplified with the image information display system 1000 in FIG. 1, and the same embodiment may be applied to the display 2000 in FIG. 2.

First of all, the image capturing sensor 120a of the data capturing circuit 120 may capture the background image of the display 140. The background image is, for example, an image of the scenery behind the panel of the display 140 displayed by the display 140. In an embodiment, the image capturing sensor 120a captures the background image at different time points respectively. For example, the image capturing sensor 120a captures the background image (referred to as first background image) of the display 140 at a time point (also referred to as first time point) and captures the background image (also referred to as second background image) of the display 140 at another time point (also referred to as second time point). There is a time interval (e.g., 0.5 second) between the first time point and the second time point. Thereafter, the processor 100 obtains the movement information (also referred to as first movement information) corresponding to the background image according to the first background image and the second background image. For example, the processor 100 compares the first background image and the second background image to acquire the level of change of the two images.

Figure 3:
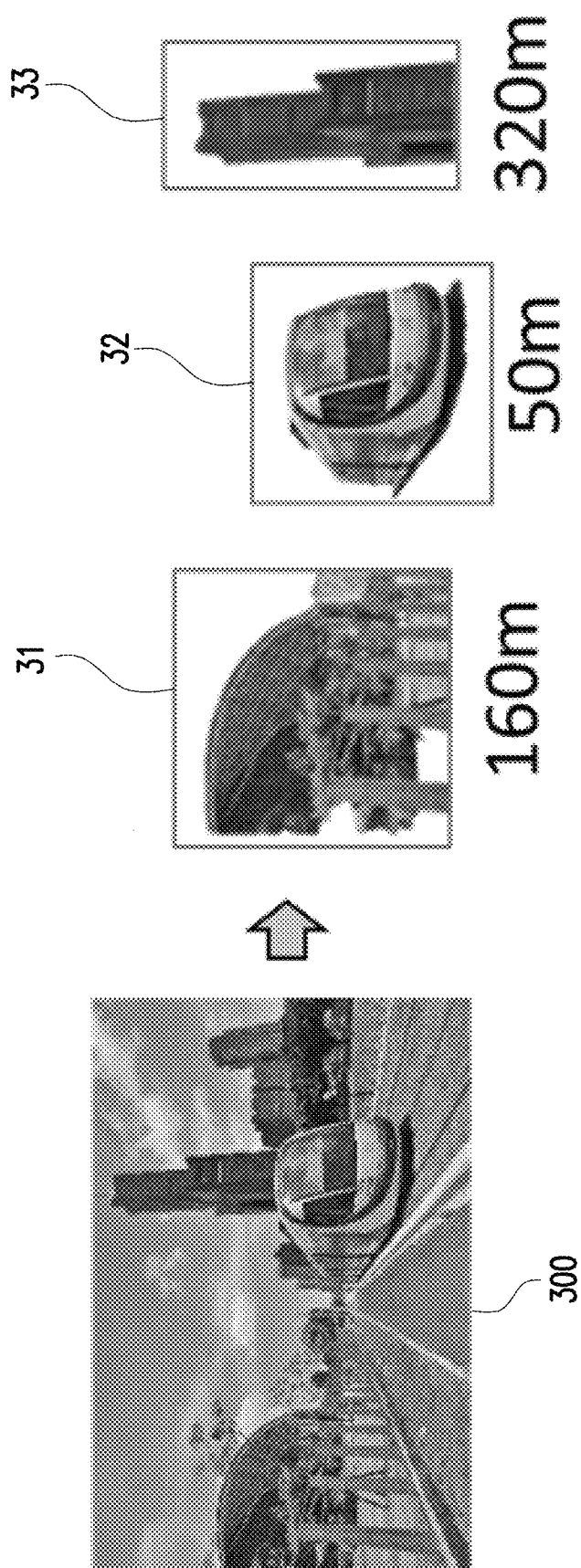
FIG. 3 is a schematic view showing recognizing an object in a background image according to an embodiment of the disclosure.

After obtaining the background image, the processor 100 may, for example, recognize the object in the background image through image recognition technology, and recognize a distance (also referred to as first distance) between the object and the position for displaying related information (e.g., dynamic information or static information) corresponding to the object in the display 140. Additionally, if the display 2000 is disposed on a vehicle (e.g., cable car, train and so on) having a fixed path, the display 2000 may pre-store the related information of the predetermined object (e.g., Taipei 101, Kaohsiung exhibition center and so on) on the path of the vehicle through random storage medium (e.g., solid-state drive, cloud hard drive and so on), and obtains related information of the predetermined object according to the position where the vehicle is arrived and the predetermined object corresponding to the position. The first distance may be, for example, obtained by using the first movement information. In other embodiments, the first distance may be obtained through a light field camera, a range finder, a radar and so on. For example, FIG. 3 is a schematic view showing recognizing an object in a background image according to an embodiment of the disclosure. Referring to FIG. 3, the processor 100, for example, may identify the object in a background image 300 to acquire that the object in the background image 300 includes a Kaohsiung exhibition center 31 that is 160 meters away from the display 140, a light-rail transit 32 that is 50 meters away from the display 140 and a Kaohsiung 85 sky tower 33 that is 320 meters away from the display 140.

Thereafter, the data capturing circuit 120 captures a relative movement information between the user who views the display 140 and the object in the background image. More specifically, the vehicle information capturing sensor 120b of the data capturing circuit 120 obtains the vehicle movement information of the vehicle equipped with the display 140. The vehicle movement information includes moving speed, acceleration and moving direction of the vehicle. The vehicle information capturing sensor 120b captures the relative movement information between the user and the object according to the vehicle movement information. In the exemplary embodiment, the relative movement information is the relative moving speed between the user and the object.

Thereafter, the data capturing circuit 120 captures the visual information corresponding to the user. For example, the user information capturing sensor 120c of the data capturing circuit 120 identifies the distance (also referred to as second distance) between the user and the position for displaying the related information of the object in the display 140.

If the display 140 is a head-mounted display device, the second distance is a distance between the user and the position for displaying the dynamic information in the display 140. If the display 140 is not a head-mounted device (e.g., handheld transparent display device, general transparent display and so on), the second distance is a distance between the user and the display.

Figure 4:
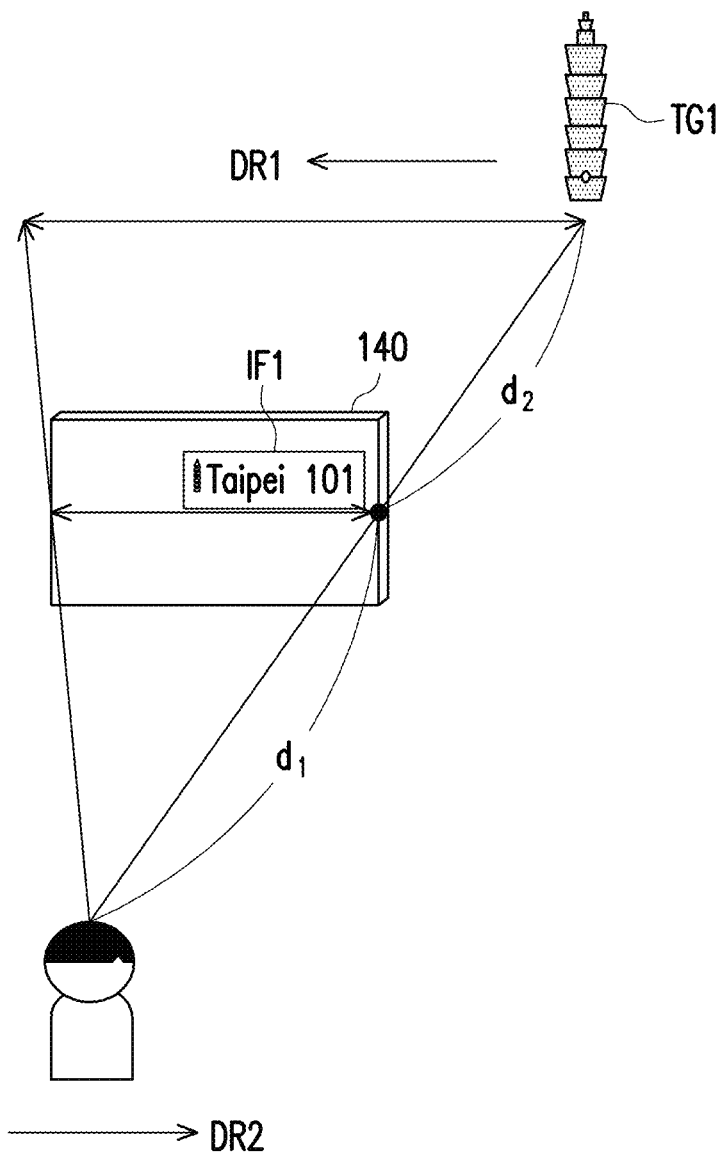
FIG. 4 is a schematic view showing determining whether a display time of an object or a related information to be displayed by a display is smaller than a predetermined value according to an embodiment of the disclosure.

Afterwards, the processor 100 determines whether a reading comfort degree corresponding to the object meets a predetermined condition according to the relative movement information and the visual information corresponding to the user. The processor 100 determines whether the display time of the object or the related information to be displayed by the display is smaller than a predetermined value. In the exemplary embodiment, the predetermined value is, for example, 2 seconds. When the display time of the object or the related information to be displayed by the display 140 is not smaller than the predetermined value, the processor 100 determines that the above-mentioned reading comfort degree meets the predetermined condition. When the display time of the object or the related information to be displayed by the display 140 is smaller than the predetermined value, the processor 100 determines that the reading comfort degree does not meet the predetermined condition. For example, FIG. 4 is a schematic view showing determining whether a display time of an object or a related information to be displayed by a display is smaller than a predetermined value according to an embodiment of the disclosure. Referring to FIG. 4, assuming that the display 140 is disposed on a vehicle, when the vehicle moves toward a direction DR2, an object TG1 that is viewed through the display 140 moves toward a direction DR1. When the object TG1 is too close to the display 140 or the vehicle is moving too fast, the display time of the object TG1 or the related information IF1 moving along with the object TG1 in the display 140 is likely to be smaller than the predetermined value. On this occasion, the processor 100 determines that the reading comfort degree does not meet the predetermined condition. On the contrary, when the object TG1 is far enough from the display 140 or the vehicle is not moving fast, the display time of the object TG1 or the related information IF1 moving along with the object TG1 in the display 140 is not smaller than the predetermined value. On this occasion, the processor 100 determines that the reading comfort degree meets the predetermined condition.

When the reading comfort degree meets the predetermined condition, the display 140 displays related information corresponding to the object. In the exemplary embodiment, the related information is, for example, a dynamic information. The dynamic information, for example, may be descriptions (e.g., name, brief introduction or pattern) regarding the object displayed dynamically by the display 140. In an embodiment, the processor 100 further determines the text size of the dynamic information to be displayed according to the distance (e.g., distance $d_2$, i.e., above-mentioned first distance in FIG. 4) between the object and the position for displaying related information corresponding to the object in the display 140, the distance (e.g., distance $d_1$, i.e., above-mentioned second distance in FIG. 4) between the user and the position for displaying related information of the object in the display 140, and the relative moving speed (i.e., above-mentioned relative movement information) between the user and the object.

In an embodiment, the vehicle information capturing sensor 120b in the image information display system 1000 may determine whether the user, the display 140 or the object TG1 moves toward the direction DR1 or DR2, and capture the relative movement information between the user and the object TG1 according to the movement information (e.g., moving speed, acceleration, and moving direction and so on) related to the user, the display 140 or the object TG1.

Furthermore, when the user is moving toward the direction DR1 or DR2 and the display 140 and the object TG1 are not moved (e.g., the moving user is watching a static object in a transparent display window), the image capturing sensor 120a in the image information display system 1000 may capture the user's image to detect the movement information related to the user, and obtains relative movement information between the user and the object TG1 according to the movement information related to the user. When the user and the display 140 are not moved and the object TG1 is moving toward the direction DR1 or DR2 (e.g., the static user is watching fish in the transparent display aquarium), the image capturing sensor 120a in the image information display system 1000 may detect the movement information related to the object TG1, and obtains the relative movement information between the user and the object TG1 according to the movement information related to the object TG1. When the user and the display 140 are moving toward the direction DR1 or DR2 and the object TG1 is not moved (e.g., the user is wearing head-mounted display device), the vehicle information capturing sensor 120b in the image information display system 1000 may detect the movement information related to the user and the display 140, and obtains relative movement information between the user and the object TG1 according to the movement information of the user and the display 140.

In an embodiment, a text size meets the following determination equation (1):

$$32 \times d_1 \leq P_t \quad (1)$$

In another embodiment, a text size meets the following determination equation (2):

$$25 \times d_1 \leq P_t \quad (2)$$

In yet another embodiment, a text size meets the following determination equation (3):

$$13 \times d_1 \leq P_t \quad (3)$$

In the above determination equations (1)-(3), $d_1$ is the second distance, $P_t$ is the text size.

In other words, in the embodiment, the processor 100 determines the text size of the dynamic information according to the second distance. In the above determination equations (1)-(3), the text size is larger than or equal to the second distance multiplied by a constant (referred to as first constant herein).

Figure 5:
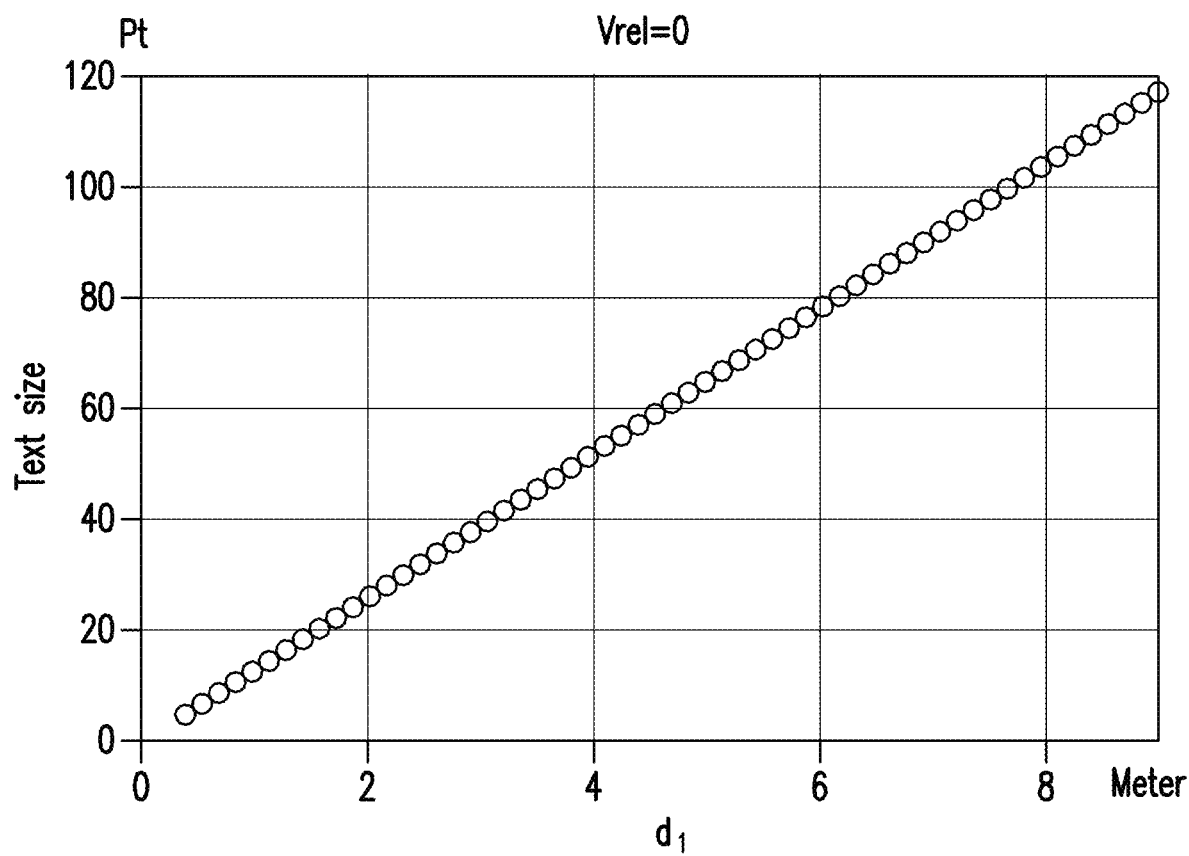
FIG. 5 is a schematic view showing calculating text size according to a second distance according to an embodiment of the disclosure.

FIG. 5 is a schematic view showing calculating text size according to a second distance according to an embodiment of the disclosure.

Referring to FIG. 5, in the example of FIG. 5, assuming that the display 140 is disposed next to a static exhibit, and the processor 100 determines the text size according to the determination equation (3). Since the display 140 is not disposed on a moving vehicle, the value of the relative movement information is 0 km/hour (i.e., $V_{rel}=0$), and when the value of the second distance is 0.35 meter (i.e., $d_1=0.35$), the calculated text size needs to be larger than or equal to 5. When the value of the second distance is 0.5 meter (i.e., $d_1=0.5$), the calculated text size needs to be larger than or equal to 7. When the value of the second distance is 1 meter (i.e., $d_1=1$), the calculated text size needs to be larger than or equal to 13. When the value of the second distance is 1.5 meters (i.e., $d_1=1.5$), the calculated text size needs to be larger than or equal to 20. When the value of the second distance is 2 meters (i.e., $d_1=2$), the calculated text size needs to be larger than or equal to 27.

However, in an embodiment, the text size meets the determination equation (4) below:

$$C \times d_1 \leq P_t; 13 \leq C \leq 850 \quad (4)$$

In the determination equation (4), C is a constant larger than or equal to 13 and smaller than or equal to 850, $d_1$ is the second distance, $P_t$ is the text size.

However, in another embodiment, the text size may also meet the determination equation (5) below:

$$\frac{d_1 \times V_{rel}}{d_1 + d_2} \leq P_t \times 1.38 \times 10^{-3} \quad (5)$$

In another embodiment, the less preferable text size may also meet the determination equation (6) below:

$$\frac{d_1 \times V_{rel}}{d_1 + d_2} \leq P_t \times 2.94 \times 10^{-3} \quad (6)$$

In yet another embodiment, the third preferable text size may also meet the determination equation (7) below:

$$\frac{d_1 \times V_{rel}}{d_1 + d_2} \leq P_t \times 5.88 \times 10^{-3} \quad (7)$$

In the determination equations (5)-(7), $d_1$ is the second distance, $d_2$ is the first distance, $V_{rel}$ is the relative movement information, $P_t$ is the text size.

In other words, in the determination equations (5)-(7), assuming that the product obtained by multiplying the second distance by the relative movement information is a first value, the sum obtained by adding the first distance and the second distance is a second value, the product obtained by multiplying the text size by a constant (referred to as second constant herein) is a third value, the quotient obtained by dividing the first value by the second value is smaller than or equal to the third value.

FIG. 6a to FIG. 6h are schematic views showing calculating text size at different vehicles according to an embodiment of the disclosure.

Figure 6A:
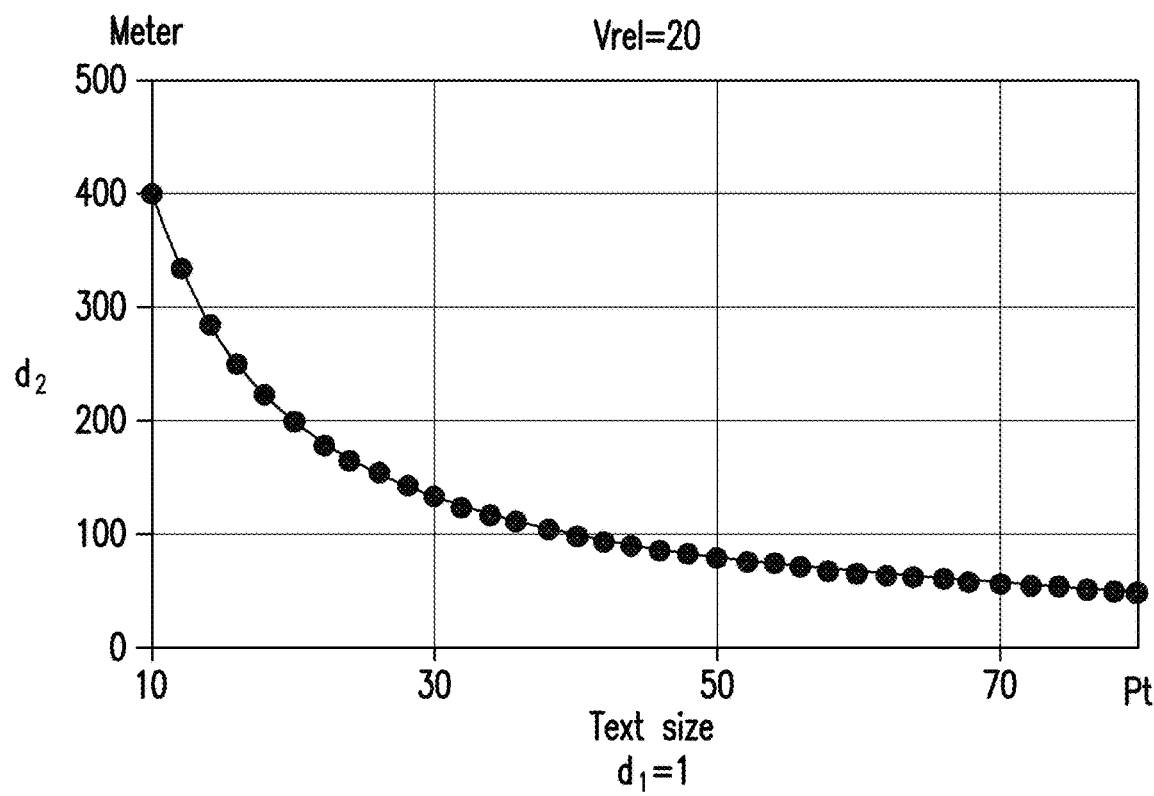
FIG. 6a to FIG. 6h are schematic views showing calculating text size at different vehicles according to an embodiment of the disclosure.

Referring to FIG. 6a, in the example of FIG. 6a, assuming that the display 140 is disposed on a touring cable car, and the processor 100 determines the text size by using the determination equation (5). When the value of the relative movement information is 20 km/hour (i.e., $V_{rel}$=20) and the value of the second distance is 1 meter (i.e., $d_1$=1), assuming that the text size is 32, then it is suitable for the user to view the scenery that is 125 meters away (i.e., $d_2$=125). When the value of the relative movement information is 20 km/hour (i.e., $V_{rel}$=20) and the value of the second distance is 1 meter (i.e., $d_1$=1), assuming that the text size is 48, then it is suitable for the user to view the scenery that is 83 meters away (i.e., $d_2$=83).

Figure 6B:
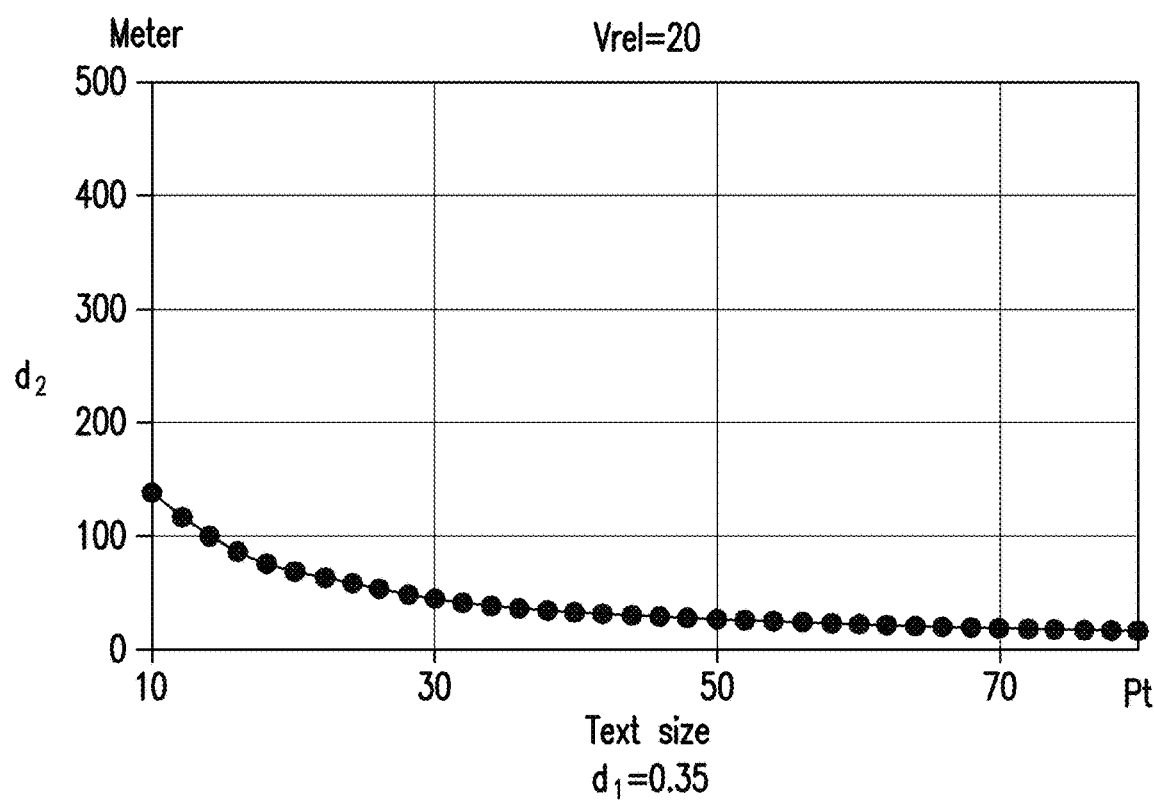

Referring to FIG. 6b, in the example of FIG. 6b, assuming that the display 140 is disposed on a touring cable car, and the processor 100 determines the text size by using the determination equation (5). When the value of the relative movement information is 20 km/hour (i.e., $V_{rel}$=20) and the value of the second distance is 0.35 meter (i.e., $d_1$=0.35), assuming that the text size is 32, then it is suitable for the user to view the scenery that is 44 meters away (i.e., $d_2$=44). When the value of the relative movement information is 20 km/hour (i.e., $V_{rel}$=20) and the value of the second distance is 0.35 meter (i.e., $d_1$=0.35), assuming that the text size is 48, then it is suitable for the user to view the scenery that is 29 meters away (i.e., $d_2$=29).

Figure 6C:
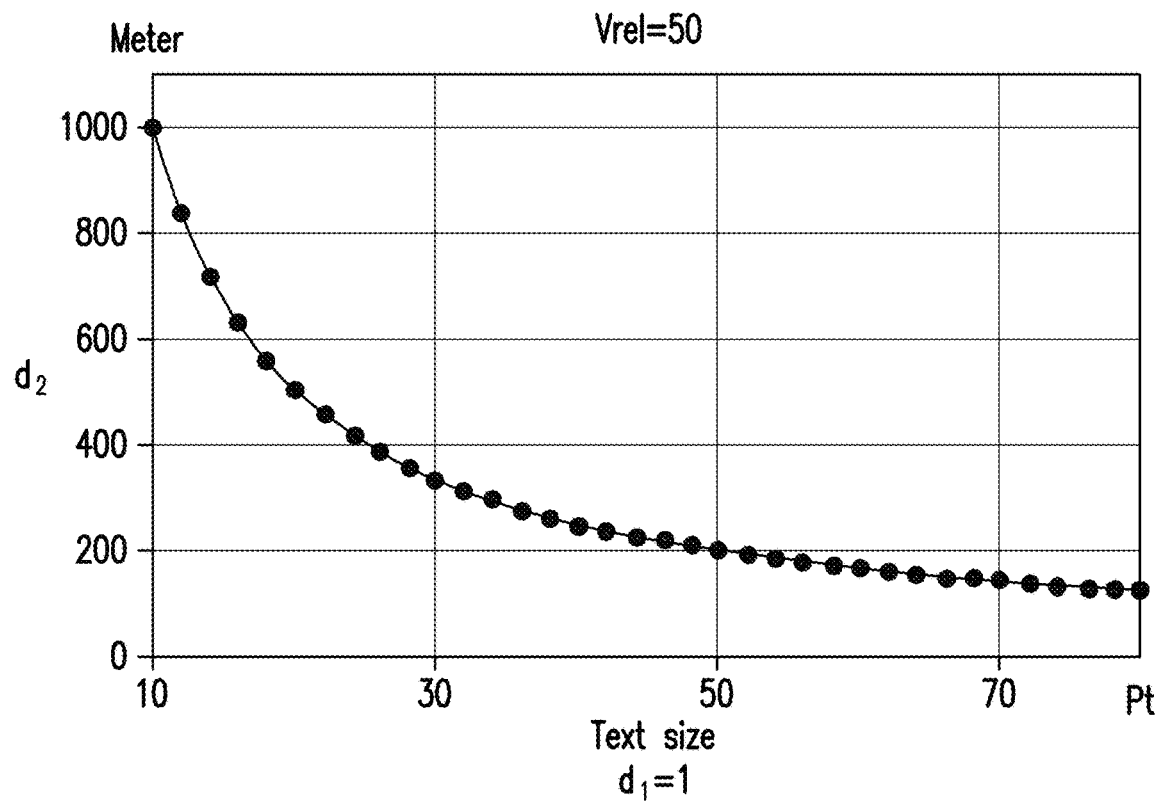

Referring to FIG. 6c, in the example of FIG. 6c, assuming that the display 140 is disposed on a light-rail transit, and the processor 100 determines the text size by using the determination equation (5). When the value of the relative movement information is 50 km/hour (i.e., $V_{rel}$=50) and the value of the second distance is 1 meter (i.e., $d_1$=1), assuming that the text size is 32, then it is suitable for the user to view the scenery that is 314 meters away (i.e., $d_2$=314). When the value of the relative movement information is 50 km/hour (i.e., $V_{rel}$=50) and the value of the second distance is 1 meter (i.e., $d_1$=1), assuming that the text size is 48, then it is suitable for the user to view the scenery that is 207 meters away (i.e., $d_2$=207).

Figure 6D:
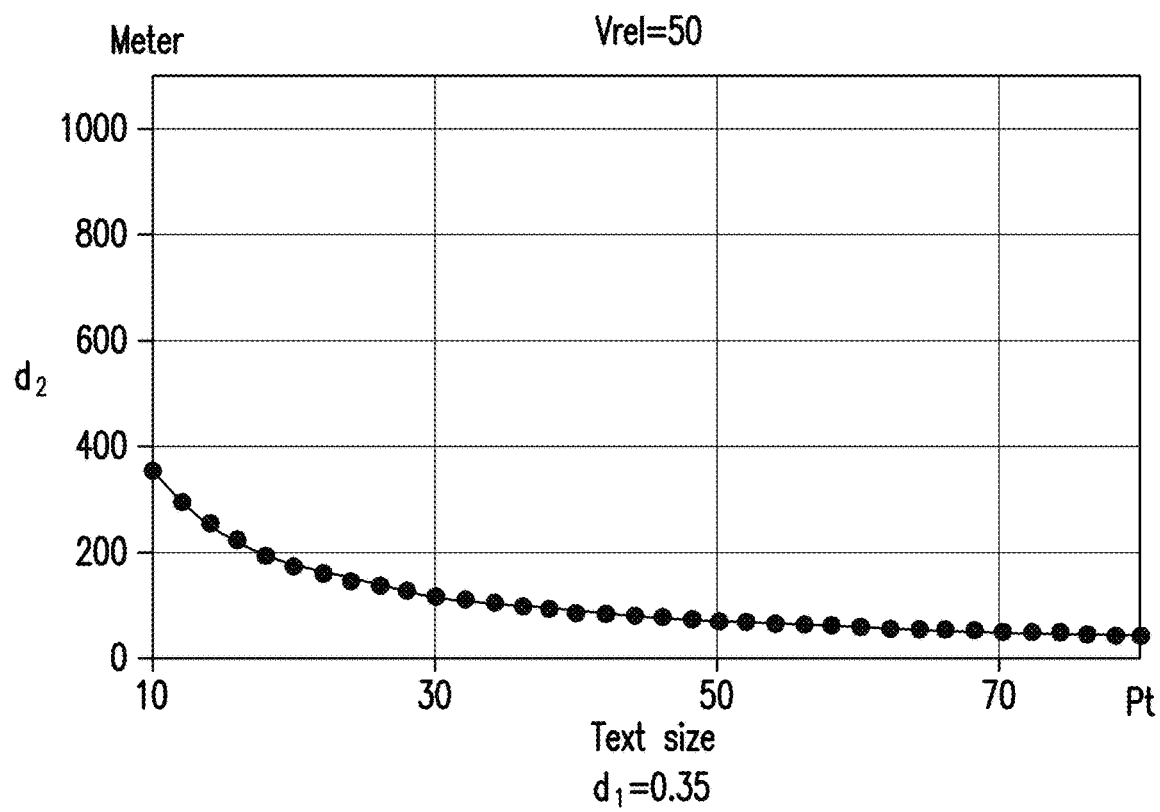

Referring to FIG. 6d, in the example of FIG. 6d, assuming that the display 140 is disposed on a light-rail transit, and the processor 100 determines the text size by using the determination equation (5). When the value of the relative movement information is 50 km/hour (i.e., $V_{rel}$=50) and the value of the second distance is 0.35 meter (i.e., $d_1$=0.35), assuming that the text size is 32, then it is suitable for the user to view the scenery that is 110 meters away (i.e., $d_2$=110). When the value of the relative movement information is 50 km/hour (i.e., $V_{rel}$=50) and the value of the second distance is 0.35 meter (i.e., $d_1$=0.35), assuming that the text size is 48, then it is suitable for the user to view the scenery that is 73 meters away (i.e., $d_2$=73).

Figure 6E:
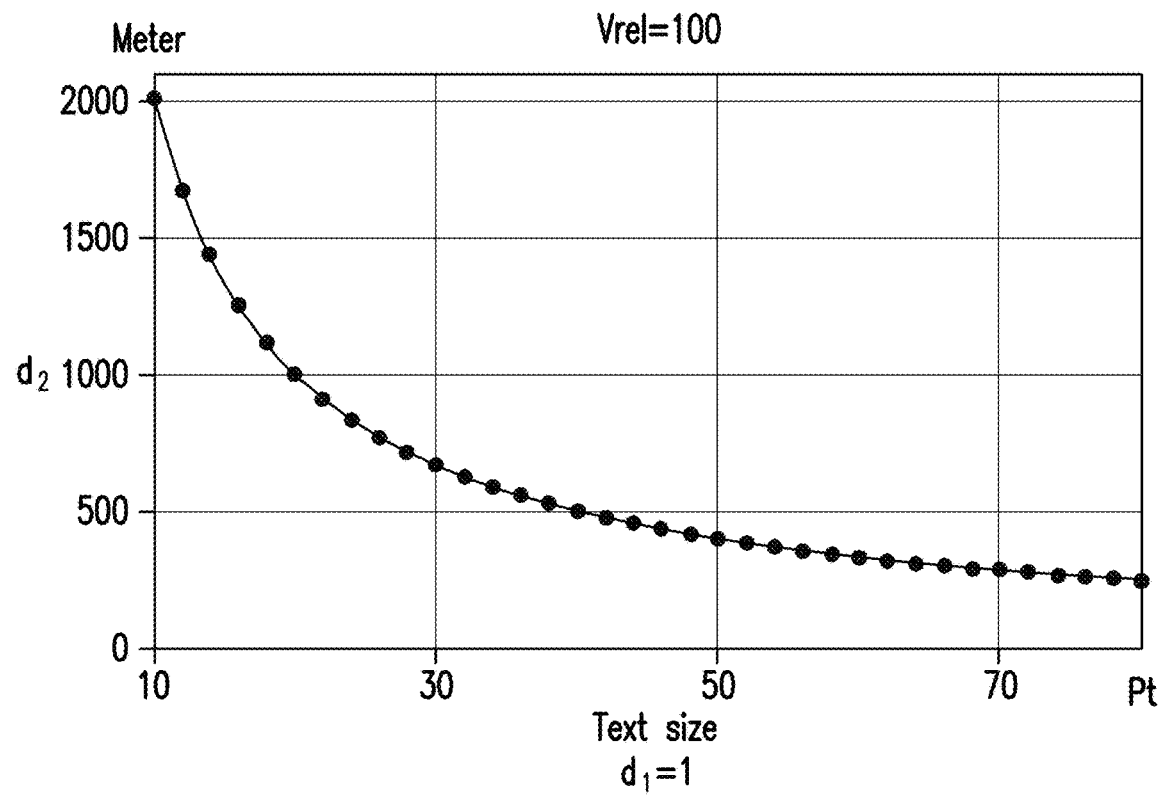

Referring to FIG. 6e, in the example of FIG. 6e, assuming that the display 140 is disposed on a train, and the processor 100 determines the text size by using the determination equation (5). When the value of the relative movement information is 100 km/hour (i.e., $V_{rel}$=100) and the value of the second distance is 1 meter (i.e., $d_1$=1), assuming that the text size is 32, then it is suitable for the user to view the scenery that is 628 meters away (i.e., $d_2$=628). When the value of the relative movement information is 100 km/hour (i.e., $V_{rel}$=100) and the value of the second distance is 1 meter (i.e., $d_1$=1), assuming that the text size is 48, then it is suitable for the user to view the scenery that is 418 meters away (i.e., $d_2$=418).

Figure 6F:
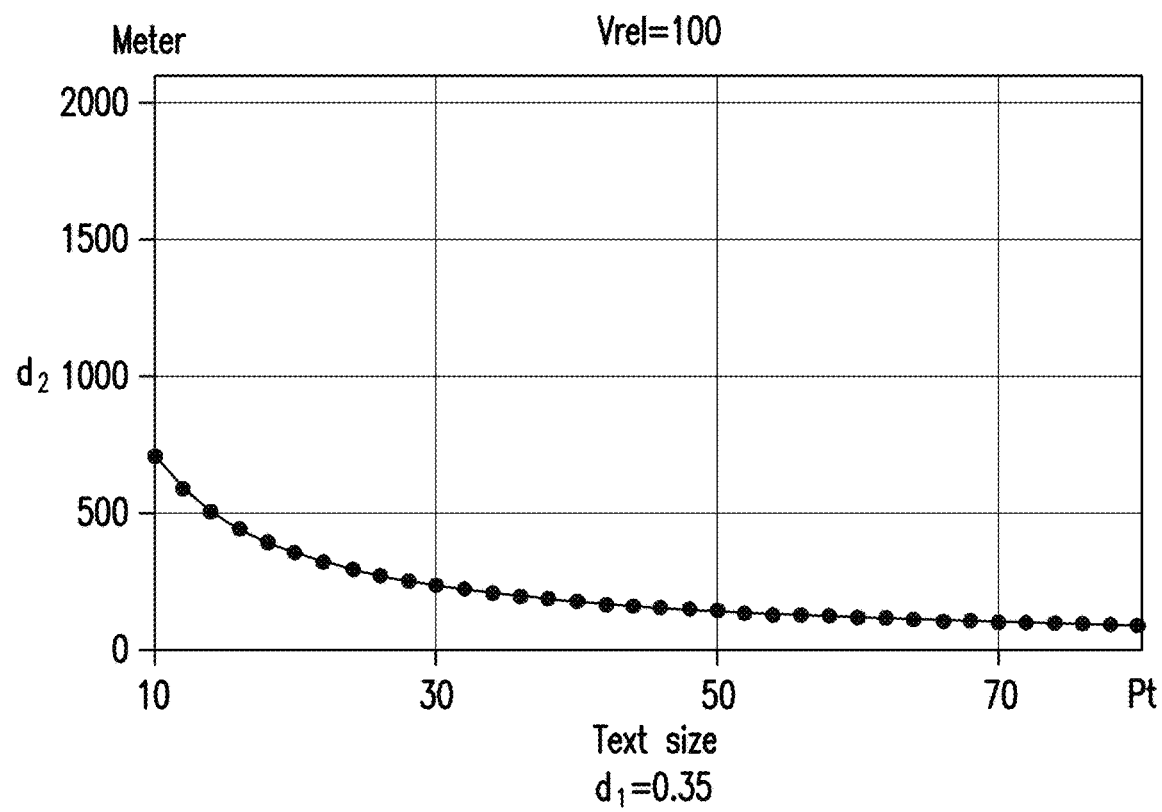

Referring to FIG. 6f, in the example of FIG. 6f, assuming that the display 140 is disposed on a train, and the processor 100 determines the text size by using the determination equation (5). When the value of the relative movement information is 100 km/hour (i.e., $V_{rel}$=100) and the value of the second distance is 0.35 meter (i.e., $d_1$=0.35), assuming that the text size is 32, then it is suitable for the user to view the scenery that is 220 meters away (i.e., $d_2$=220). When the value of the relative movement information is 100 km/hour (i.e., $V_{rel}$=100) and the value of the second distance is 0.35 meter (i.e., $d_1$=0.35), assuming that the text size is 48, then it is suitable for the user to view the scenery that is 146 meters away (i.e., $d_2$=146).

Figure 6G:
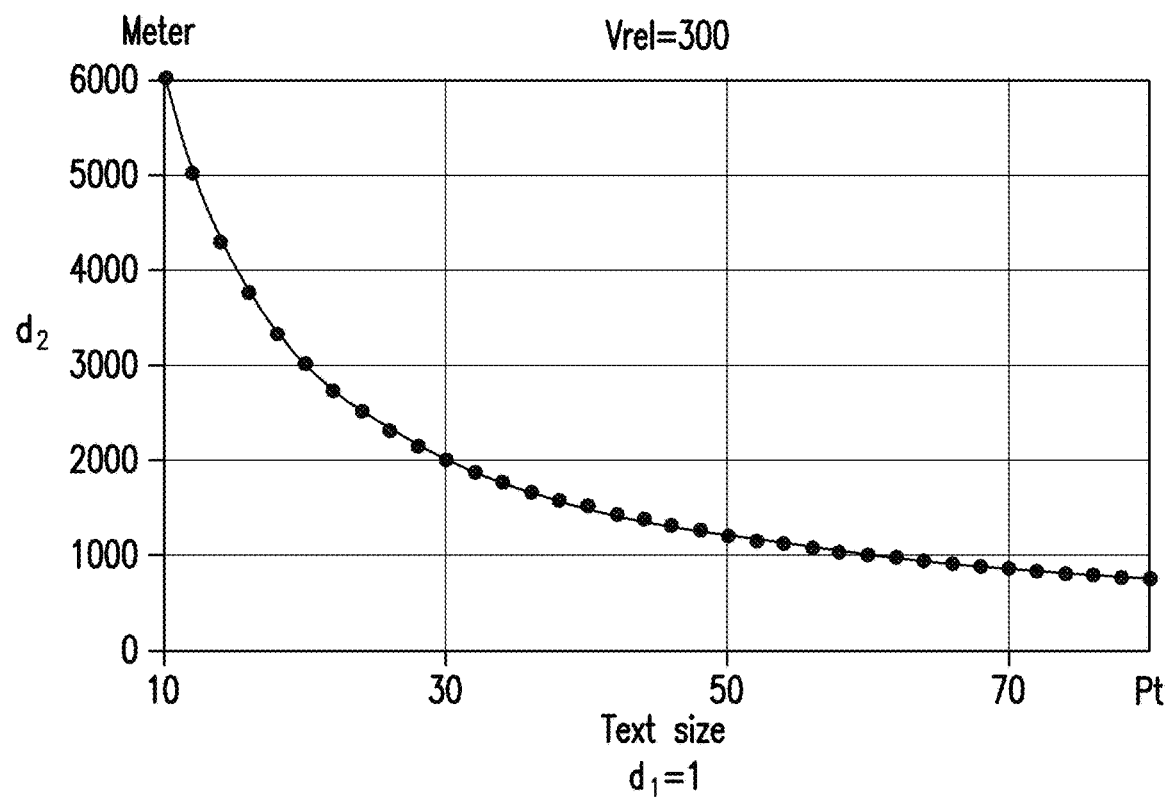

Referring to FIG. 6g, in the example of FIG. 6g, assuming that the display 140 is disposed on a high-speed transit, and the processor 100 determines the text size by using the determination equation (5). When the value of the relative movement information is 300 km/hour (i.e., $V_{rel}$=300) and the value of the second distance is 1 meter (i.e., $d_1$=1), assuming that the text size is 32, then it is suitable for the user to view the scenery that is 1886 meters away (i.e., $d_2$=1886). When the value of the relative movement information is 300 km/hour (i.e., $V_{rel}$=300) and the value of the second distance is 1 meter (i.e., $d_1$=1), assuming that the text size is 48, then it is suitable for the user to view the scenery that is 1257 meters away (i.e., $d_2$=1257).

Figure 6H:
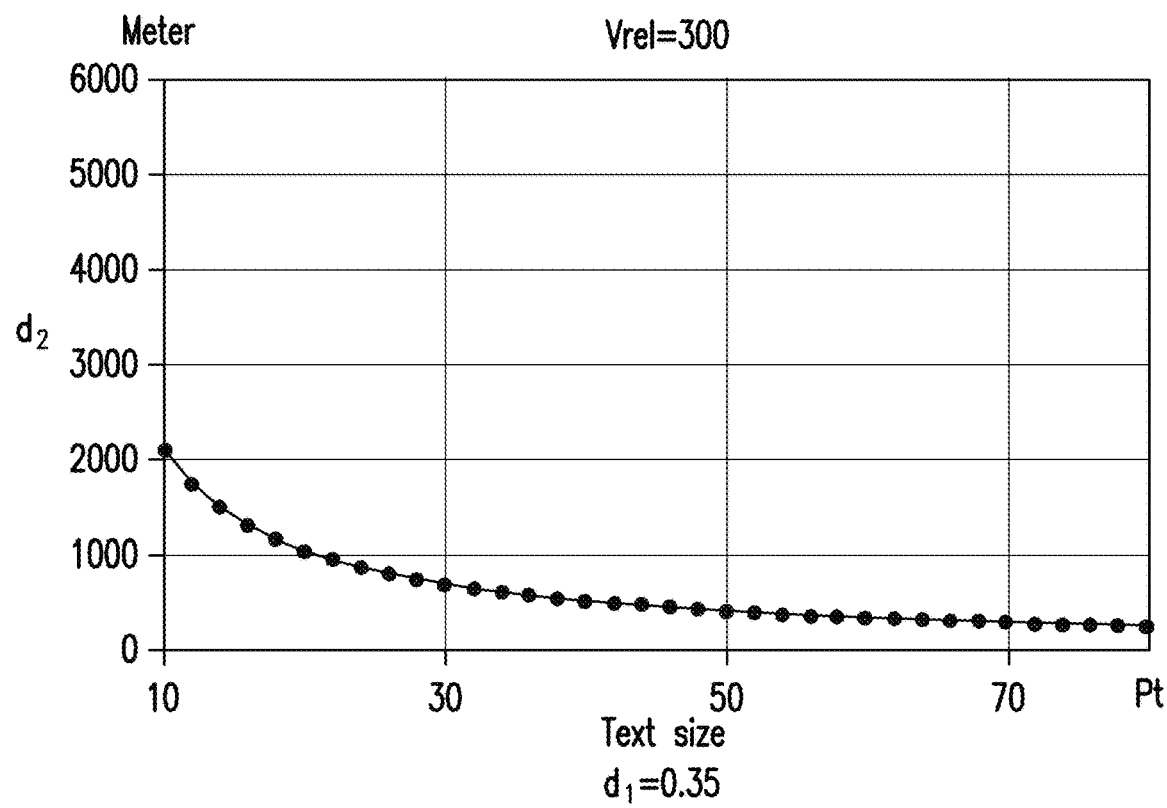

Referring to FIG. 6h, in the example of FIG. 6h, assuming that the display 140 is disposed on a high-speed transit, and the processor 100 determines the text size by using the determination equation (5). When the value of the relative movement information is 300 km/hour (i.e., $V_{rel}$=300) and the value of the second distance is 0.35 meter (i.e., $d_1$=0.35), assuming that the text size is 32, then it is suitable for the user to view the scenery that is 660 meters away (i.e., $d_2$=660). When the value of the relative movement information is 300 km/hour (i.e., $V_{rel}$=300) and the value of the second distance is 0.35 meter (i.e., $d_1$=0.35), assuming that the text size is 48, then it is suitable for the user to view the scenery that is 440 meters away (i.e., $d_2$=440).

Additionally, after the text size is determined, the processor 100 may further determine the moving speed of the text of the dynamic information according to the first distance, the second distance and the relative movement information, and displays the dynamic information corresponding to the object by the display 140 according to the text size and the moving speed of character.

The moving speed of text may meet the determination equation (8) below:

$$V_{inf} = \frac{d_1 \times V_{rel}}{d_1 + d_2} \qquad (8)$$

In the determination equation (8), $d_1$ is the second distance, $d_2$ is the first distance, $V_{rel}$ is the relative movement information, $V_{inf}$ is the moving speed of character.

In other words, the moving speed of text is the quotient obtained by dividing a fourth value by a fifth value, the fourth value is the product obtained by multiplying the second distance by the relative movement information, and the fifth value is the sum obtained by adding the first distance and the second distance.

In an embodiment, the processor 100 may select the display position, starting/finishing point and path of the text in the display 140 according to the determined number of text and text size.

FIG. 7a and FIG. 7b are schematic views showing displaying related information of an object according to an embodiment of the disclosure.

Referring to FIG. 7a, in the embodiment, when the user is located at a vehicle equipped with the display 140 and the vehicle is moving toward a direction DR3, the user may see the object TG1 on another side of the display 140 moving toward a direction DR4. When viewing the object TG1 moving toward the direction DR4, the user may also see that the related information IF1 related to the object TG1 displayed by the display 140 is displayed around the object TG1 and moving toward the direction DR4 according to the determined moving speed of character. In the embodiment, the related information IF1 that moves along with the object TG1 viewed by the user through the display 140 may also be referred to as "dynamic information".

In the embodiment of FIG. 7a, the related information IF1 regarding the object TG1 is displayed as a single text string (e.g., "Taipei 101" shown in FIG. 7a), but not limited thereto. Referring to FIG. 7b, related information IF2 regarding the object TG1 is displayed as multiple lines of text (e.g., "Taipei 101" is 509.2 meters tall with 101 floors" shown in FIG. 7b). By displaying the related information IF1 or related information IF2 regarding the object TG1, the user may easily associate the object TG1 with the related information IF1 or the related information IF2 so it is easy for user to read. Additionally, in the embodiment, the processor 100 may automatically determine the text size, the display position, the moving speed and the moving direction suitable for the related information IF1 or the related information IF2.

In an embodiment, the display 140 may further display the dynamic information at a position close to the object in the display 140 in a rolling text style according to the calculated text display method.

Figure 8:
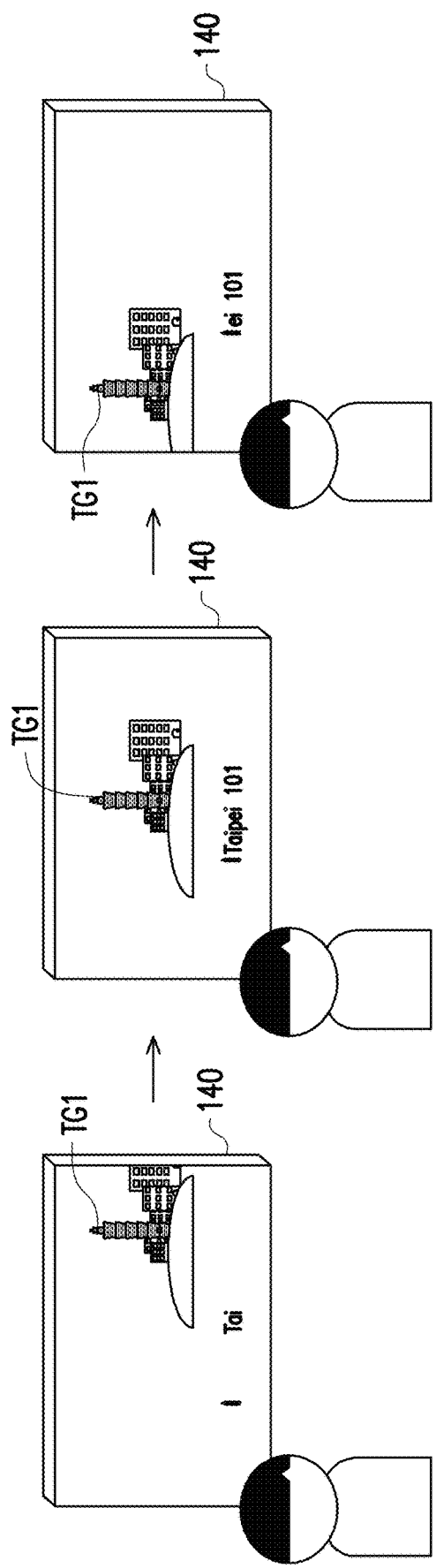
FIG. 8 is a schematic view showing displaying dynamic information in a rolling text style according to an embodiment of the disclosure.

FIG. 8 is a schematic view showing displaying dynamic information in a rolling text style according to an embodiment of the disclosure.

Figure 9:
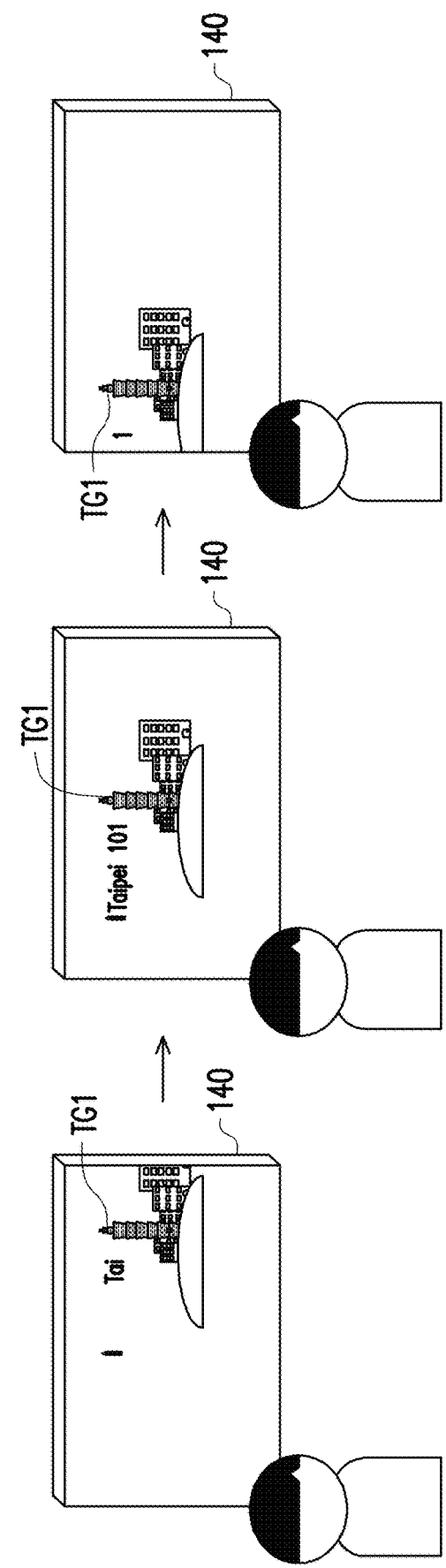
FIG. 9 is a schematic view showing displaying dynamic information in a rolling text style according to another embodiment of the disclosure.

Referring to FIG. 8, in the embodiment of FIG. 8, the related information (e.g., "Taipei 101" shown in FIG. 8) related to the object TG1 is displayed under the display 140 in the rolling text style according to the calculated text display method. Additionally, FIG. 9 is a schematic view showing displaying dynamic information in a rolling text style according to another embodiment of the disclosure. Referring to FIG. 9, in the embodiment of FIG. 9, the related information (e.g., "Taipei 101" shown in FIG. 9) related to the object TG1 is displayed at a position (e.g., left side of the object TG1) close to the object TG1 in the display in the rolling text style according to the calculated text display method.

Figure 10:
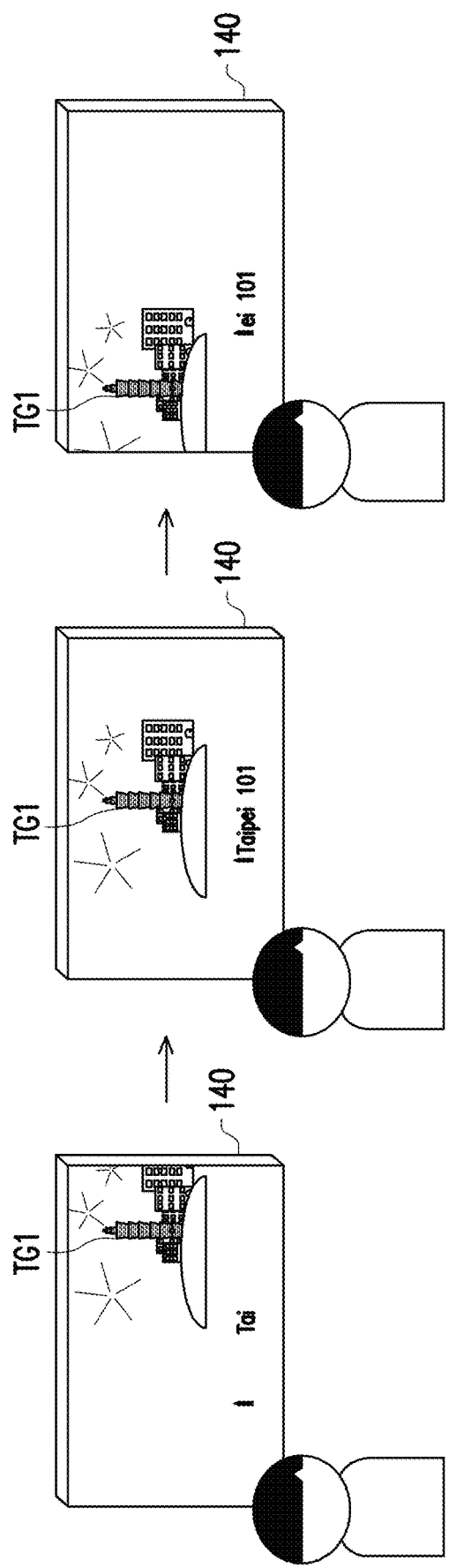
FIG. 10 is a schematic view of dynamic information according to an embodiment of the disclosure.

In an embodiment, the dynamic information regarding the object TG1 displayed by the display 140 is not limited to text only, the dynamic information may also include pattern. FIG. 10 is a schematic view of dynamic information according to an embodiment of the disclosure. Referring to FIG. 10, in the example shown in FIG. 10, the display 140 may, for example, display the pattern of "firework" around the object TG1. When the dynamic information of pattern "firework" is displayed, the related information (e.g., "Taipei 101" shown in FIG. 10) related to the object TG1 may also be displayed under the display 140 in the rolling text style according to the calculated text display method.

Additionally, the embodiments of the disclosure provide no limitation to the display position of the dynamic information. For example, FIG. 11a to FIG. 11f are schematic views of display position of dynamic information according to an embodiment of the disclosure.

Figures 11A, 11B:
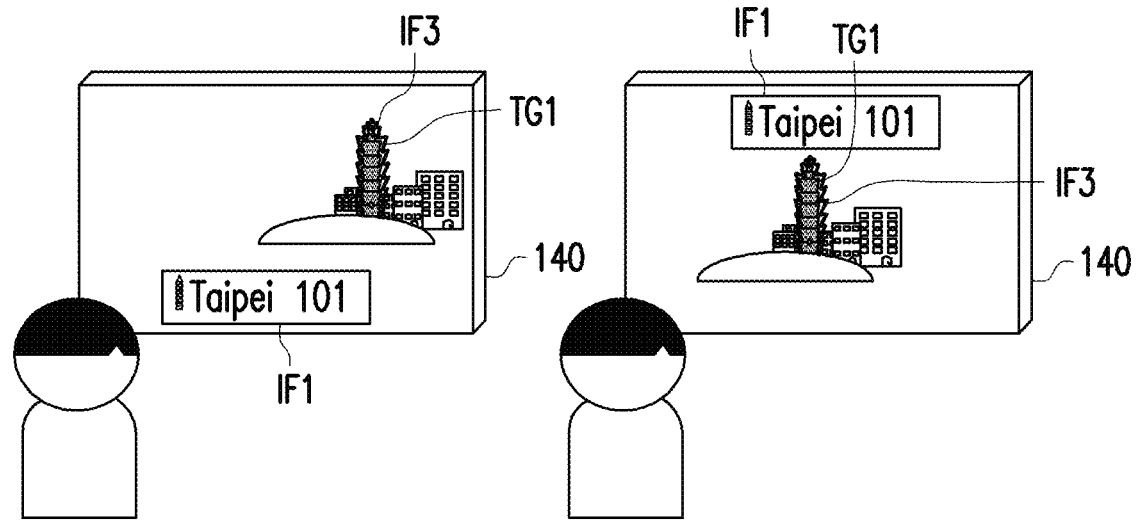
Figure 11C:
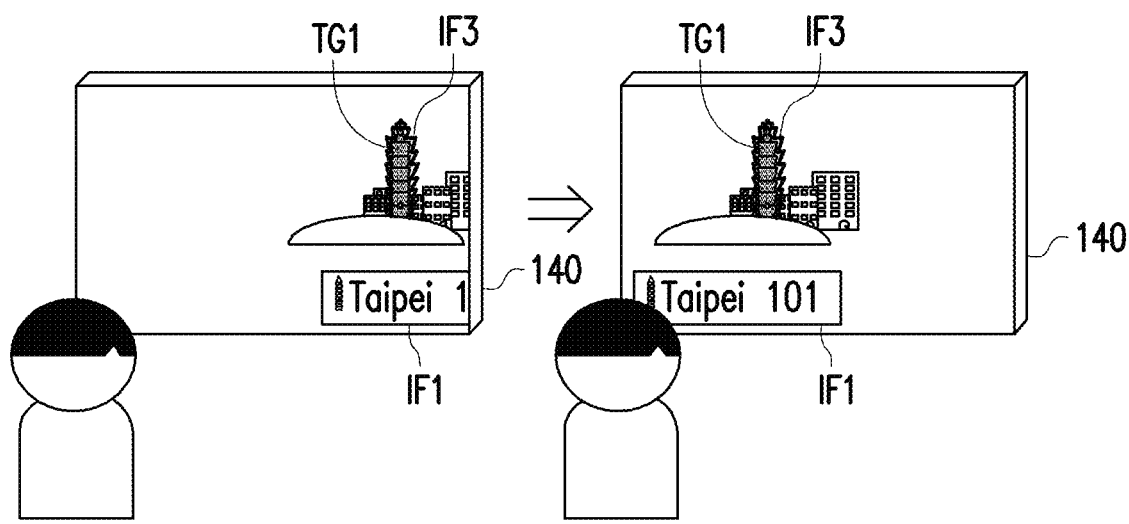

Referring to FIG. 11a, the related information IF1 corresponding to the object TG1 may be displayed right under the display 140, and the related information IF3 corresponding to the object TG1 may be displayed around the object TG1. Moreover, referring to FIG. 11b, the related information IF1 corresponding to the object TG1 may be displayed right above the display 140, and the related information IF3 corresponding to the object TG1 may be displayed around the object TG1. Furthermore, referring to FIG. 11c, when the display 140 is disposed on the vehicle and the vehicle is moved, the related information IF1 corresponding to the object TG1 may be displayed around (e.g., right under) the object TG1 and moved along with the object TG1, and the related information IF3 corresponding to the object TG1 may be displayed around the object TG1. Additionally, referring to FIG. 11d to FIG. 11f, the related information IF1 corresponding to the object TG1 may be displayed close to the left side, the right side or the lower side of the object TG1.

Figure 12A:
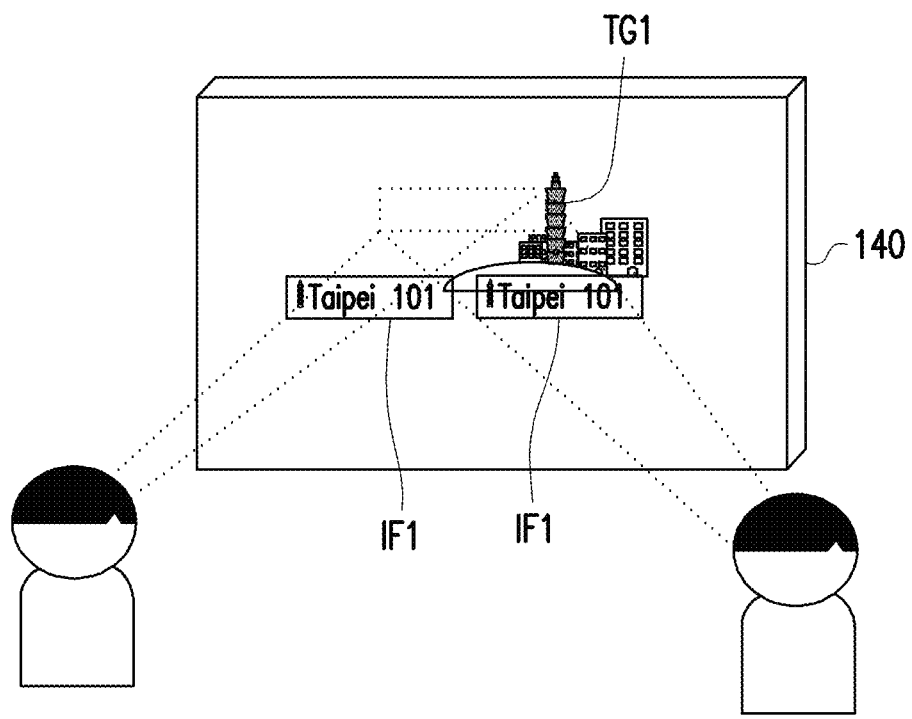
FIG. 12a to FIG. 12b are schematic views of display position of dynamic information according to an embodiment of the disclosure.
Figure 12B:
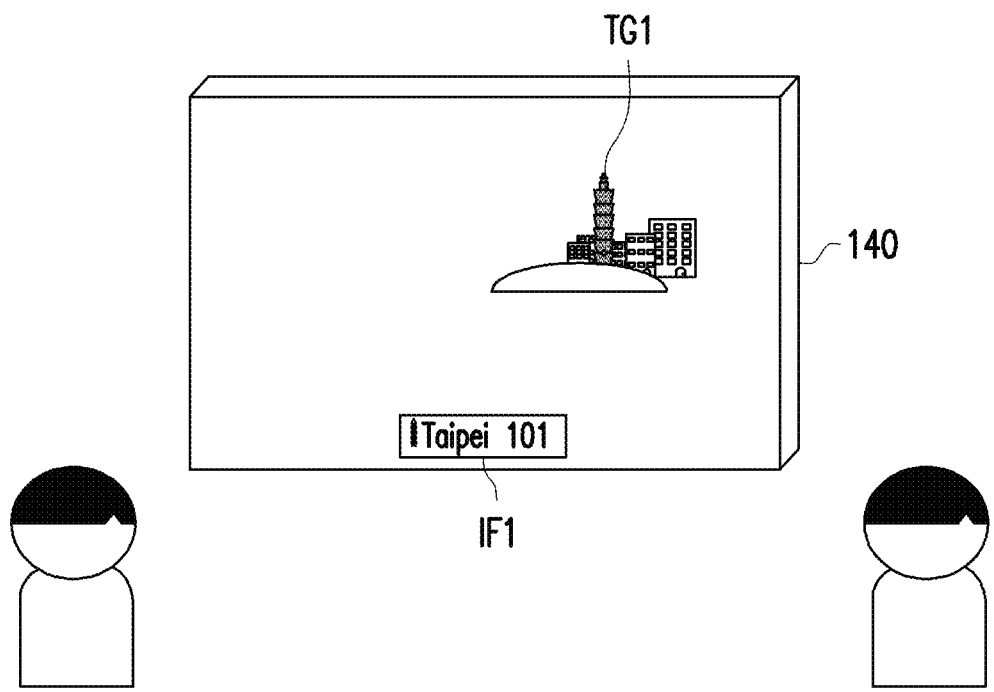

FIG. 12a to FIG. 12b are schematic views of display position of dynamic information according to an embodiment of the disclosure. Referring to FIG. 12a, in an embodiment, the processor 100 may determine whether the user and another one or more users watch the display 140 simultaneously by using the data capturing circuit 120. When the user and another one or more users watch the display 140 simultaneously, the processor 100 determines whether the display 140 has enough space for displaying a plurality of related information IF1 corresponding to the dynamic information. When the display 140 has enough space for displaying the plurality of related information IF1 corresponding to the dynamic information, the display 140 may display the related information corresponding to the user among the plurality of related information IF1 for the user to watch, and display the related information corresponding to another one or more users among the plurality of related information IF1 for another one or more users to watch. Additionally, referring to FIG. 12b, in an embodiment, when the display 140 does not have enough space for displaying the plurality of related information IF1 corresponding to the dynamic information, the display 140 only displays one single related information IF1 for the user and another one or more users to watch.

Figure 13A:
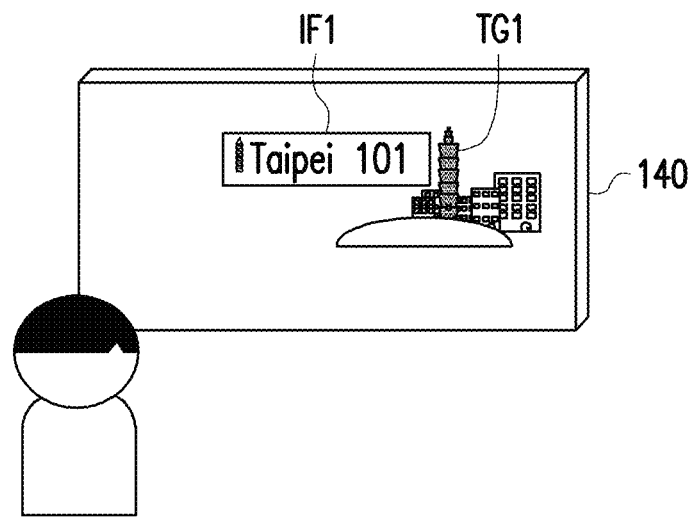
FIG. 13a is a schematic view of a display frame of a display when a vibration amplitude is not large according to an embodiment of the disclosure.
Figure 13B:
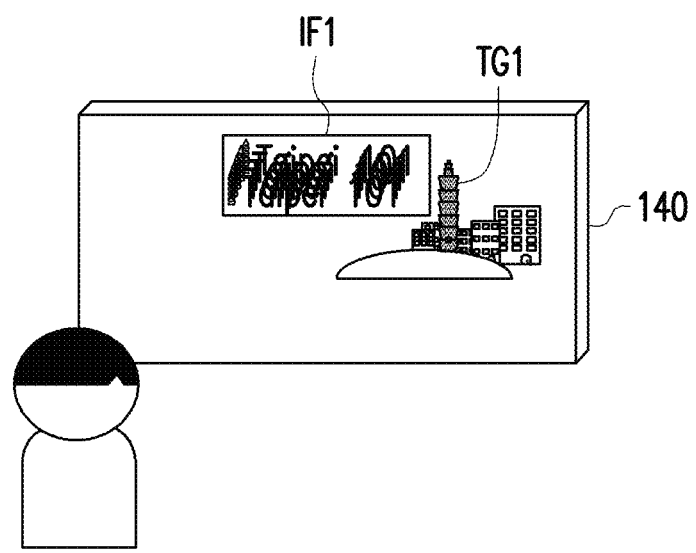
FIG. 13b is a schematic view of a display frame of a display when a vibration amplitude is overly large according to an embodiment of the disclosure.

When the display 140 is disposed on the vehicle, if the acceleration, vibration or shaking amplitude of the vehicle is overly large, the display 140 is vibrated, which affects the display of the display 140. FIG. 13a is a schematic view of a display frame of a display when a vibration amplitude is not large according to an embodiment of the disclosure. FIG. 13b is a schematic view of a display frame of a display when a vibration amplitude is overly large according to an embodiment of the disclosure. Referring to FIG. 13a, when the display 140 is not vibrated too much, the user may clearly see the related information IF1 displayed by the display 140. However, referring to FIG. 13b, when the display 140 is vibrated at a great level, the user might not be able to see the related information IF1 displayed by the display 140 clearly. Therefore, in the exemplary embodiment, when the acceleration or moving direction of the vehicle is changed, the processor 100 may determine whether the vibration amplitude of the displayed related information IF1 (or dynamic information) is larger than a threshold value. When the vibration amplitude of the displayed dynamic information is larger than a threshold value, the processor 100 may perform image compensation operation (e.g., reversed movement feedback operation) to reduce the vibration amplitude of the related information IF1 (or dynamic information), thereby improving the reading comfort degree of the user. The image compensation operation (or reversed movement feedback operation) may be derived through conventional technique and thus related descriptions are omitted hereinafter.

In an embodiment, the size of the related information IF1 (or dynamic information) displayed by the display 140 may be relevant to the distance between the object and the user. For example, when the second distance is fixed, and the distance between the object and the user is closer, due to the viewing angle, the size of the related information IF1 (or dynamic information) may be represented with a larger size. When the distance between the object and the user is farther, due to the viewing angle, the size of the related information IF1 (or dynamic information) may be represented with a smaller size. In other words, the size of the related information (or dynamic information) displayed by the display 140 is inversely proportional to the distance between the user and the object such that it is easier for the user to read.

In an embodiment, the data capturing circuit 120 may obtain the visual information corresponding to the user, and determine the display method of the related information according to the visual information. The visual information may include at least one of a viewing angle corresponding to the user, a field of vision corresponding to the user, the object that is viewed by the user and user's preference corresponding to the user. The user's preference may include, for example, user's gender, age, specific user, eye disease or displays condition and so on. The data capturing circuit 120 may, for example, obtain the visual information from a database or input manually by the user, thereby determining the display method of the related information according to the obtained visual information.

In an embodiment, when the processor 100 determines that the reading comfort degree does not meet the predetermined condition, the display 140 does not display the related information (i.e., dynamic information) corresponding to the object dynamically. On the contrary, the display 140 may display the related information (referred to as static information herein) corresponding to the object in a static manner.

In an embodiment, the image information display method of the disclosure may also be applied to a head-mounted device (e.g., glasses, helmet and so on) or a vehicle head-up display device. When the user and the object are moved relatively, the image information display method of the disclosure enables an imaging plane of the head-mounted device to display suitable related information (e.g., suitable pattern, position, pattern information, moving speed or direction and so on), such that the displayed related information and the object are highly associated.

Figure 14:
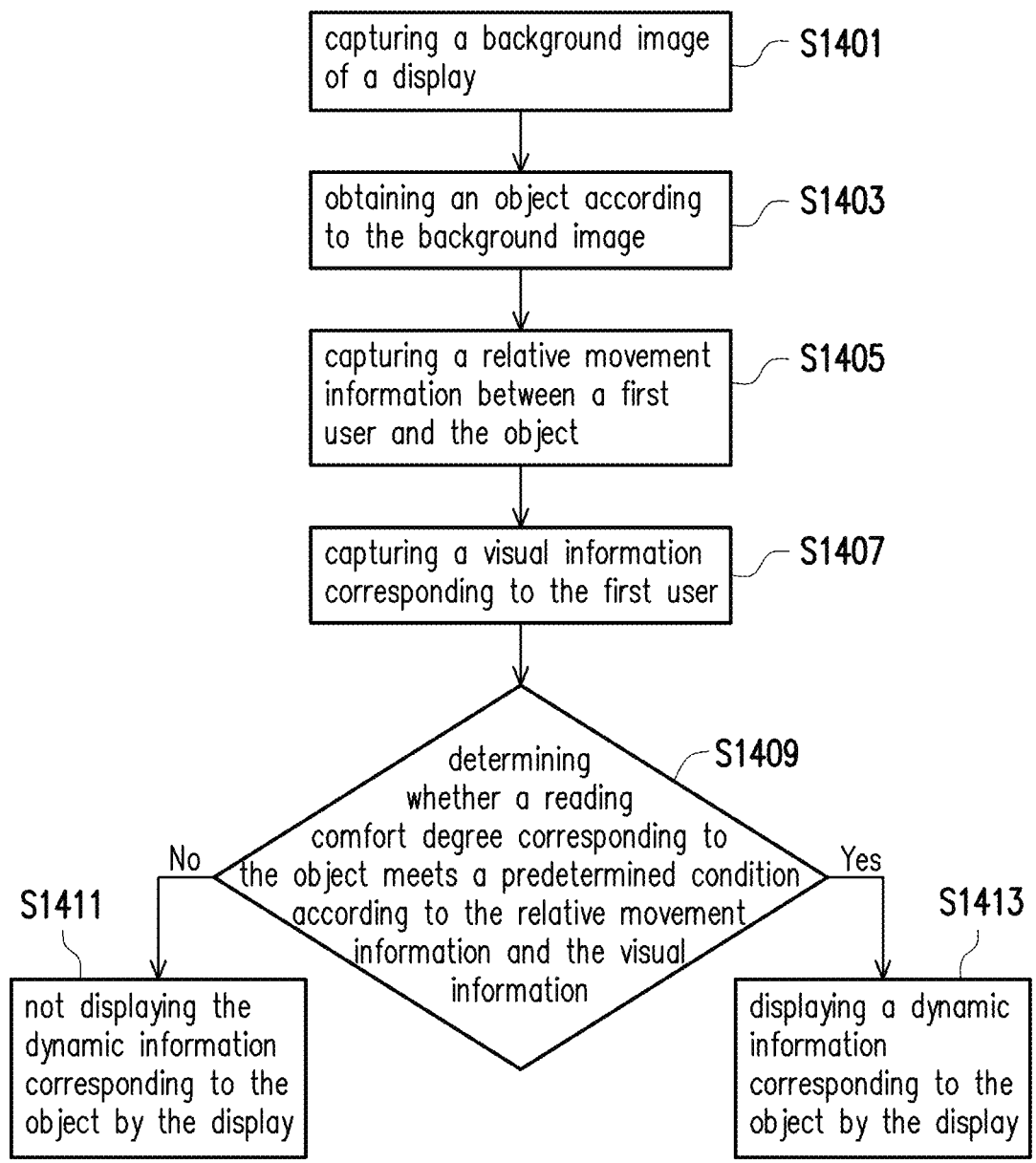
FIG. 14 is a flowchart of an image information display method according to an embodiment of the disclosure.

FIG. 14 is a flowchart of an image information display method according to an embodiment of the disclosure. Referring to FIG. 14, in step S1401, the data capturing circuit 120 captures the background image of the display 140. In step S1403, the processor 100 obtains the object according to the background image. In step S1405, the data capturing circuit 120 captures the relative movement information between the first user and the object. In step S1407, the data capturing circuit 120 captures the visual information corresponding to the first user. In step S1409, the processor 100 determines whether the reading comfort degree corresponding to the object meets the predetermined condition according to the relative movement information and the visual information. When the reading comfort degree does not meet the predetermined condition, in step S1411, the display 140 does not display the dynamic information corresponding to the object. When the reading comfort degree meets the predetermined condition, in step S1413, the display 140 displays dynamic information corresponding to the object.

Figure 15:
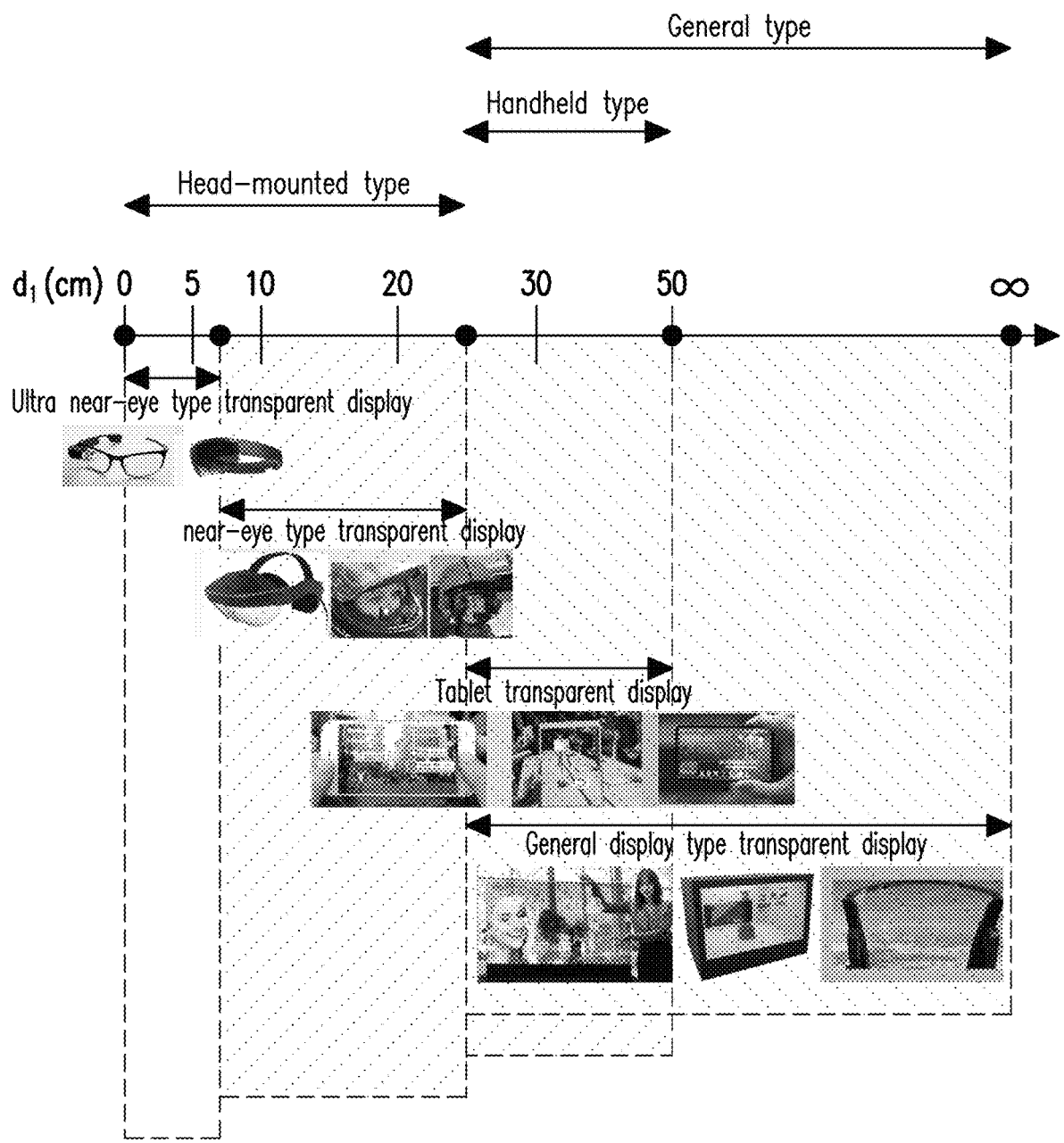
FIG. 15 is a schematic view of a second distance according to an embodiment of the disclosure.

FIG. 15 is a schematic view of a second distance according to an embodiment of the disclosure. Referring to FIG. 15, different second distances $d_1$ may be formed between different types of displays and the users. In the exemplary embodiment, the display may be categorized into head-mounted display, handheld display and general display. The head-mounted display may be an ultra near-eye type transparent display or a near-eye type transparent display such as google glasses, virtual reality device and so on. The handheld display may be a tablet transparent display such as mobile phone, tablet device and so on. General display may be general display type transparent display such as transparent liquid crystal TV, transparent liquid crystal display window and so on. Furthermore, the second distance $d_1$ of the ultra near-eye type transparent display may be in a range of 0-7 cm, and the second distance $d_1$ of the near-eye type transparent display may be in a range of 7-25 cm. The second distance $d_1$ of the tablet transparent display may be in a range of 25-50 cm. The second distance $d_1$ of the general display transparent display may be 25 cm or more.

In summary, the image information display method, the image information display system and the display provided in the disclosure enable the display to display related information (e.g., dynamic information or static information) related to the target object. In order to reduce the problem that user feels dizzy and has difficulty recognizing the displayed related information when the vehicle is moving at a high speed, the image information display method, image information display system and display of the disclosure provide an information display method that is more suitable and comfortable for user.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. An image information display method, comprising:
    capturing a background image of a display, wherein the background image comprises an image of a scenery behind a panel of the display;
    obtaining an object according to the background image;
    capturing a relative movement information between a first user and the object;
    capturing a visual information corresponding to the first user;
    determining whether a reading comfort degree corresponding to the object meets a predetermined condition according to the relative movement information and the visual information, comprising:
        determining whether a specific display time is smaller than a predetermined value, wherein the specific display time comprises a first display time of the object to be displayed by the display or a second display time of a dynamic information to be displayed by the display;
determining that the reading comfort degree meets the predetermined condition when the specific display time is not smaller than the predetermined value; and
determining that the reading comfort degree does not meet the predetermined condition when the specific display time is smaller than the predetermined value;
displaying the dynamic information corresponding to the object by the display when the reading comfort degree meets the predetermined condition; and
not displaying the dynamic information corresponding to the object by the display when the reading comfort degree does not meet the predetermined condition.

2. The image information display method according to claim 1, further comprising:
displaying a static information corresponding to the object by the display when the reading comfort degree does not meet the predetermined condition.

3. The image information display method according to claim 1, wherein the step of obtaining the object according to the background image and the step of capturing the visual information corresponding to the first user comprise:
identifying a first distance between the object and a position for displaying the dynamic information in the display; and
identifying a second distance between the first user and the position for displaying the dynamic information in the display.

4. The image information display method according to claim 3, wherein the step of capturing the relative movement information between the first user and the object comprises:
determining whether the first user, the display or the object is static, and calculating the relative movement information between the first user and the object according to a movement information related to the first user, the display or the object, the first distance and the second distance.

5. The image information display method according to claim 3, wherein the step of displaying the dynamic information corresponding to the object by the display comprises:
determining a text size of the dynamic information according to the second distance; and
displaying the dynamic information corresponding to the object by the display according to the text size.

6. The image information display method according to claim 5, wherein the text size is larger than or equal to the second distance multiplied by a first constant.

7. The image information display method according to claim 6, wherein the step of displaying the dynamic information corresponding to the object by the display comprises:
determining a text moving speed of the dynamic information according to the first distance, the second distance and the relative movement information; and
displaying the dynamic information corresponding to the object by the display according to the text moving speed.

8. The image information display method according to claim 7, wherein the text moving speed is a quotient obtained by dividing a fourth value by a fifth value, the fourth value is a product obtained by multiplying the second distance by the relative movement information, the fifth value is a sum of the first distance and the second distance.

9. The image information display method according to claim 3, wherein the step of displaying the dynamic information corresponding to the object by the display comprises:
determining a text size of the dynamic information according to the first distance, the second distance and the relative movement information; and
displaying the dynamic information corresponding to the object by the display according to the text size.

10. The image information display method according to claim 9, wherein a quotient obtained by dividing a first value by a second value is smaller than or equal to a third value, wherein the first value is a product obtained by multiplying the second distance by the relative movement information, the second value is a sum obtained by adding the first distance and the second distance, the third value is a product obtained by multiplying the text size by a second constant.

11. The image information display method according to claim 1, further comprising:
determining whether the first user and a second user watch the display simultaneously;
determining whether the display has enough space for displaying a first dynamic information and a second dynamic information corresponding to the dynamic information when the first user and the second user watch the display simultaneously, wherein the first dynamic information is specifically for the first user and the second dynamic information is specifically for the second user;
displaying the first dynamic information for the first user to watch and displaying the second dynamic information for the second user to watch when the display has enough space for simultaneously displaying the first dynamic information and the second dynamic information corresponding to the dynamic information; and
only displaying the one single dynamic information for the first user and the second user to watch when the display does not have enough space for simultaneously displaying the first dynamic information and the second dynamic information corresponding to the dynamic information.

12. A display, comprising:
a display circuit;
a data capturing circuit, configured for capturing a background image of the display, wherein the background image comprises an image of a scenery behind a panel of the display; and
a processor, coupled to the display circuit and the data capturing circuit,
wherein the processor identifies an object in the background image,
the data capturing circuit capturing a relative movement information between a first user and the object,
the data capturing circuit capturing a visual information corresponding to the first user,
the processor determining whether a reading comfort degree corresponding to the object meets a predetermined condition according to the relative movement information and the visual information, wherein the processor determines whether a specific display time is smaller than a predetermined value, wherein the specific display time comprises a first display time of the object to be displayed by the display or a second display time of a dynamic information to be displayed by the display;
wherein the processor determines that the reading comfort degree meets the predetermined condition when the specific display time is not smaller than the predetermined value; and wherein the processor determines that the reading comfort degree does not meet the predetermined condition when the specific display time is smaller than the predetermined value, the display circuit displaying the dynamic information corresponding to the object when the reading comfort degree meets the predetermined condition, and the display circuit not displaying the dynamic information corresponding to the object when the reading comfort degree does not meet the predetermined condition.

13. The display according to claim 12, wherein
the display circuit displays a static information corresponding to the object when the reading comfort degree does not meet the predetermined condition.

14. The display according to claim 12, wherein in the operation of identifying the object in the background image,
the processor identifies a first distance between the object and a position for displaying the dynamic information in the display.

15. The display according to claim 14, wherein the data capturing circuit comprises a first user data capturing sensor, wherein in the operation of capturing the visual information corresponding to the user,
the first user data capturing sensor identifies a second distance between the first user and the position for displaying the dynamic information in the display, wherein the data capturing circuit further comprises a vehicle data capturing sensor and an image capturing sensor, wherein in the operation of capturing the relative movement information between the first user and the object,
the vehicle data capturing sensor or the image capturing sensor determines whether the first user, the display or the object is static, and calculating the relative movement information between the first user and the object according to a movement information related to the first user, the display or the object, the first distance and the second distance.

16. The display according to claim 15, wherein in the operation of displaying the dynamic information corresponding to the object by the display,
the processor determines a text size of the dynamic information according to the second distance, and
the display displays the dynamic information corresponding to the object according to the text size.

17. The display according to claim 16, wherein the text size is larger than or equal to the second distance multiplied by a first constant.

18. The display according to claim 17, wherein in the operation of displaying the dynamic information corresponding to the object by the display,
the processor determines a text moving speed of the dynamic information according to the first distance, the second distance and the relative movement information, and the display circuit displays the dynamic information corresponding to the object according to the text moving speed.

19. The display according to claim 18, wherein the text moving speed is a quotient obtained by dividing a fourth value by a fifth value, the fourth value is a product obtained by multiplying the second distance by the relative movement information, the fifth value is a sum of the first distance and the second distance.

20. The display according to claim 15, wherein in the operation of displaying the dynamic information corresponding to the object by the display,
the processor determines the text size of the dynamic information according to the first distance, the second distance and the relative movement information, and
the display circuit displays the dynamic information corresponding to the object according to the text size.

21. The display according to claim 20, wherein a quotient obtained by dividing a first value by a second value is smaller than or equal to a third value, wherein the first value is a product obtained by multiplying the second distance by the relative movement information, the second value is a sum obtained by adding the first distance and the second distance, the third value is a product obtained by multiplying the text size by a second constant.

22. The display according to claim 12, wherein the processor determines whether the first user and a second user watch the display simultaneously through the data capturing circuit,
wherein the processor determines whether the display has enough space for displaying a first dynamic information and a second dynamic information corresponding to the dynamic information when the first user and the second user watch the display simultaneously, wherein the first dynamic information is specifically for the first user and the second dynamic information is specifically for the second user,
wherein the display circuit displays the first dynamic information for the first user to watch and displays the second dynamic information for the second user to watch when the display has enough space for simultaneously displaying the first dynamic information and the second dynamic information corresponding to the dynamic information,
wherein the display circuit only displays the one single dynamic information for the first user and the second user to watch when the display does not have enough space for simultaneously displaying the first dynamic information and the second dynamic information corresponding to the dynamic information.

* * * * *